(12) United States Patent
Hiraoka et al.

(10) Patent No.: US 8,608,605 B2
(45) Date of Patent: Dec. 17, 2013

(54) TRANSMISSION APPARATUS FOR A TRACTOR

(75) Inventors: Minoru Hiraoka, Osakasayama (JP); Atsushi Hayashi, Nara (JP); Masaru Andou, Kawachinagano (JP); Masakazu Hino, Sakai (JP)

(73) Assignee: Kubota Corporation, Osaka (JP)

( * ) Notice: Subject to any disclaimer, the term of this patent is extended or adjusted under 35 U.S.C. 154(b) by 119 days.

(21) Appl. No.: 13/202,702

(22) PCT Filed: Mar. 23, 2011

(86) PCT No.: PCT/JP2011/056948
§ 371 (c)(1),
(2), (4) Date: Dec. 14, 2011

(87) PCT Pub. No.: WO2012/035810
PCT Pub. Date: Mar. 22, 2012

(65) Prior Publication Data
US 2012/0225746 A1  Sep. 6, 2012

(30) Foreign Application Priority Data

Sep. 14, 2010 (JP) ................................. 2010-205886
Sep. 14, 2010 (JP) ................................. 2010-205887

(51) Int. Cl.
*F16H 3/72* (2006.01)
*F16H 47/08* (2006.01)

(52) U.S. Cl.
USPC .................................. 475/72; 475/6; 475/83

(58) Field of Classification Search
USPC ........................................ 180/33.4; 475/6, 72
See application file for complete search history.

(56) References Cited

U.S. PATENT DOCUMENTS

| | | | |
|---|---|---|---|
| 5,248,283 A * | 9/1993 | Eckhardt et al. ................ | 475/72 |
| 8,303,448 B2 * | 11/2012 | Hiraoka et al. ................ | 475/83 |
| 2003/0109347 A1 * | 6/2003 | Weeramantry ................ | 475/72 |
| 2009/0270212 A1 | 10/2009 | Ueda et al. | |

FOREIGN PATENT DOCUMENTS

| | | |
|---|---|---|
| JP | 200825803 A | 2/2008 |
| JP | 200839003 A | 2/2008 |
| WO | 2008004360 A1 | 1/2008 |

* cited by examiner

*Primary Examiner* — David D Le
*Assistant Examiner* — Colby M Hansen
(74) *Attorney, Agent, or Firm* — The Webb Law Firm

(57) ABSTRACT

A transmission apparatus for a tractor is operable to transmit a forward drive force in a wide speed changing range to the traveling device and which is operable also to transmit a reverse drive force to the traveling device. A planetary transmission section is configured to output the forward drive force in whichever case a hydrostatic stepless speed changing section is speed-changed to a forward rotation speed change state or a reverse rotation speed change state. A low speed transmission clutch couples a low speed side speed changing gear to a counter shaft to be rotatable therewith. A high speed transmission clutch couples a high speed side speed changing gear to the counter shaft to be rotatable therewith. A reverse transmission clutch couples a reverse transmission gear to an output shaft to be rotatable therewith.

4 Claims, 11 Drawing Sheets

|  |  |  | auxiliary speed changing section (60) | low speed transmission clutch (45) | high speed transmission clutch (46) | reverse transmission clutch (52) |
|---|---|---|---|---|---|---|
| forward traveling | low speed mode | 1st speed range | L | ON | OFF | OFF |
| | | 2nd speed range | L | OFF | ON | OFF |
| | high speed mode | 1st speed range | H | ON | OFF | OFF |
| | | 2nd speed range | H | OFF | ON | OFF |
| reverse traveling | low speed mode | | L | OFF | OFF | ON |
| | high speed mode | | H | OFF | OFF | ON |

|  |  | reverse transmission clutch (154) | 1st speed clutch (141c) | 2nd speed clutch (142c) | 3rd speed clutch (143c) | 4th speed clutch (144c) |
|---|---|---|---|---|---|---|
| forward traveling | 1st speed range | OFF | ON | OFF | OFF | OFF |
| | 2nd speed range | OFF | OFF | ON | OFF | OFF |
| | 3rd speed range | OFF | OFF | OFF | ON | OFF |
| | 4th speed range | OFF | OFF | OFF | OFF | ON |
| reverse traveling | | ON | OFF | OFF | OFF | OFF |

TRANSMISSION APPARATUS FOR A TRACTOR

TECHNICAL FIELD

The present invention relates to a transmission apparatus for a tractor comprising a hydrostatic stepless speed changing section configured to input a drive force from an engine, a planetary transmission section configured to combine a drive force outputted from the hydraulic stepless speed changing section with the drive force from the engine and to output a resultant combined force, and a traveling transmission section for outputting the output from the planetary transmission section to a traveling device.

BACKGROUND ART

As an example of a transmission apparatus for a tractor of the above-noted type, there is one described in Patent Document 1. In the apparatus described in Patent Document 1, a traveling transmission section is comprised of a speed changing outputting section receiving the output from the planetary transmission section and a forward/reverse switchover device receiving the output from the speed changing output section.

More particularly, in the case of the apparatus described in Patent Document 1, the speed changing output section includes a first speed clutch, a second speed clutch, a third speed clutch and a fourth speed clutch. In association with a speed changing control by the hydraulic stepless speed changing section, the first speed clutch, the second speed clutch, the third speed clutch and the fourth speed clutch are controlled to be appropriately switched over into an engaged state or a disengaged state, whereby the output from the planetary transmission section is transmitted via the forward/reverse switchover device to the traveling transmission device in one of the four speeds including the first to fourth speed ranges and with also being speed-changed in a stepless manner in each speed range. The forward/reverse switchover device includes a forward clutch and a reverse clutch. In operation, when the forward clutch is switched into the engaged state, the output from the speed changing output section is converted into a forward drive force and then transmitted as such to the traveling device. When the reverse clutch is switched into the engaged state, the output from the speed changing output section is converted into a reverse drive force and then transmitted as such to the traveling device.

PRIOR ART DOCUMENT(S)

Patent Document(s)

Patent Document 1: Japanese Unexamined Patent Application Publication No. 2008-025803 (JP2008-025803 A)

SUMMARY OF THE INVENTION

Object to be Achieved by the Invention

With application of the above-described prior art, when the forward drive and the reverse drive of the traveling device are to be made possible, in addition to the provision of a speed range setting section acting as a speed change processing section for speed-changing the output from the planetary transmission section to allow transmission of the output from the planetary transmission section in one of a plurality of speed ranges to the traveling device, the apparatus further requires a forward/reverse switchover device capable of selectively providing a forward transmission state wherein the drive force to be transmitted to the traveling device may be provided as a forward drive force, and a reverse transmission state wherein the drive force to be transmitted to the traveling device may be provided as a reverse drive force. So that, the apparatus would be costly.

If the function of the hydrostatic stepless speed changing section to output the drive force in the reverse rotation direction is utilized also as the function for transmitting a reverse drive force to the traveling device, it becomes possible to transmit the reverse drive force to the traveling device without provision of the forward/reverse switchover device. In that case, however, due to rather poor transmission efficiency of the hydrostatic stepless speed changing section, there would tend to occur significant power loss.

The object of the present invention is to provide a transmission apparatus for a tractor which is operable to transmit a forward drive force in a wide speed changing range to the traveling device and which is operable also to transmit the reverse drive force to the traveling device in an inexpensive manner and with good transmission efficiency.

Means to Fulfill the Object

The above-noted object is fulfilled, according to a first aspect of the present invention as under:

A transmission apparatus for a tractor comprising:
a hydrostatic stepless speed changing section configured to input a drive force from an engine;
a planetary transmission section configured to combine a drive force outputted from the hydraulic stepless speed changing section with the drive force from the engine, and to output a resultant force; and
a traveling transmission section for outputting the output from the planetary transmission section to a traveling device;
wherein said planetary transmission section is configured to output a forward drive force both in case the hydrostatic stepless speed changing section is speed-changed to a forward rotation speed change state for outputting a drive force in a forward rotation direction and in case the hydrostatic stepless speed changing section is speed-changed to a reverse rotation speed change state for outputting a drive force in a reverse rotation direction;
wherein said traveling transmission section includes:
  a speed range setting section operable to effect a change speed operation between a plurality of speed-changed transmission states wherein the forward drive force outputted from the planetary transmission section is sorted into one of a plurality of speed ranges and outputted from speed range setting section as the forward drive force, and a neutral state wherein the drive force transmission is stopped, and
  a reverse transmission section operable to switch over between a reverse transmission state wherein the forward drive force outputted from the planetary transmission section is converted into a reverse drive force and outputted from reverse transmission section, and a neutral state wherein the drive force transmission is stopped;
wherein said planetary transmission section includes a low speed output gear and a high speed output gear;
wherein said speed range setting section includes:
  a low speed side speed changing gear mounted on a counter shaft to be rotatable relative thereto and meshed with the low speed output gear,
  a high speed side speed changing gear mounted on the counter shaft to be rotatable relative thereto and meshed with the high speed output gear, a counter gear mounted on the counter shaft to be rotatable therewith, an output shaft gear supported on an output shaft to be rotatable therewith and meshed with the counter gear, a low speed transmission clutch switchable between an engaged state for coupling said low speed side speed changing gear to the counter shaft to be rotatable therewith and a disengaged state for allowing rotation of said low speed side speed changing gear relative to the counter shaft, and a high speed transmission clutch switchable between an engaged state for coupling said high speed side speed changing gear to the counter shaft to be rotatable therewith and a disengaged state for allowing rotation of said high speed side speed changing gear relative to the counter shaft, and wherein said reverse transmission section includes:

a reverse transmission gear supported on the output shaft to be rotatable relative thereto and meshed with said low speed side output gear; and a reverse transmission clutch switchable between an engaged state for coupling said reverse transmission gear to said output shaft to be rotatable therewith and a disengaged state for allowing rotation of the reverse transmission gear relative to said output shaft.

With the above-described arrangement, in whichever case the hydrostatic stepless speed changing section is speed-changed into the forward rotation transmission state or the reverse rotation transmission state, a forward drive force is outputted from the planetary transmission section. Then, if the speed range setting section is speed-changed into one of the speed-changed transmission states and if the reverse transmission section is speed-changed into the neutral state, the forward drive force outputted from the planetary transmission section is transmitted as it is, i.e. as the forward drive force, to the traveling device. In this case, as the low speed transmission clutch and the high speed transmission clutch in the speed range setting section are appropriately controlled into the engaged state or disengaged state in association with a speed change control by the hydrostatic stepless speed changing section, the forward drive force outputted from the planetary transmission section is selectively set or sorted by the speed range setting section into one of two speed ranges including a first speed range and a second speed range; and in whichever case the forward drive force is sorted into the first speed range or the second speed range, as the hydrostatic stepless speed changing section is speed change controlled, the forward drive force transmitted to the traveling device is speed-changed in a stepless manner. On the other hand, if the speed range setting section is speed-changed into the neutral state and if the reverse transmission section is speed-changed into the reverse transmission state, the forward drive force outputted from the planetary transmission section is converted into a reverse drive force by the reverse transmission section and transmitted as such to the traveling device. In this case, in response to a speed change control of the hydrostatic stepless speed changing section, the reverse drive force transmitted to the traveling device is speed-changed in a stepless manner.

With the above-described arrangement, the low speed transmission clutch is provided between the low speed side speed changing gear and the counter shaft; and the high speed transmission clutch is provided between the high speed side speed changing gear and the counter shaft; and also the reverse transmission clutch is provided between the reverse transmission gear and the output shaft. Accordingly, the low and high speed transmission clutches and the reverse transmission clutch are mounted in distribution with the former two on the counter shaft and the latter on the output shaft, and these components can be assembled into the traveling transmission section with easy operations.

Therefore, a forward drive force can be transmitted to the traveling device in the wide speed range extending across the two stages of speed ranges and in a stepless manner, so that it is readily possible to realize a traveling speed suitable for a work or a traveling location. At the same time, without providing the hydrostatic stepless speed changing section with the function of realizing a reverse drive force, with the provision of the reverse transmission section alone, a reverse drive force can be transmitted to the traveling device. So that, reverse traveling of the tractor can be made with good transmission efficiency and inexpensively. Further, as the low speed transmission clutch, the high speed transmission clutch and the reverse transmission clutch are readily assembled into the traveling transmission section, the apparatus can be obtained inexpensively in this respect also.

A second aspect of the present invention is as under.

A speed reduction transmission ratio in case the force is transmitted from the low speed side output gear via the reverse transmission gear and the reverse transmission clutch to the output shaft is set smaller than a speed reduction transmission ratio in case the force is transmitted from the low speed side output gear via the low speed side speed changing gear, the low speed transmission clutch, the counter shaft, the counter gear and the output shaft gear to the output shaft.

With the above-described arrangement, the speed change range of the output shaft, when the output shaft is driven in reverse in response to an operation of the reverse transmission clutch into the engaged state and the output shaft is driven in a changed speed in response to a speed change of the hydrostatic stepless speed changing section, is set greater than the speed change range of the output shaft when the output shaft is driven forwardly in response to an operation of the low speed transmission clutch and the output shaft is driven in a changed speed in response to a speed change of the hydrostatic stepless speed changing section.

Therefore, as the traveling device can be driven in a changed speed on the reverse side in a wider speed change range than the speed change range when the traveling device is driven forwardly in response to an operation of the low speed transmission clutch into the engaged state, so that it is readily possible to realize a reverse speed suitable for a work or a traveling location.

The above-noted object is fulfilled also by a third aspect of the present invention as under.

A transmission apparatus for a tractor comprising:

a hydrostatic stepless speed changing section configured to input a drive force from an engine;

a planetary transmission section configured to combine a drive force outputted from the hydraulic stepless speed changing section with the drive force from the engine and to output a resultant force; and a traveling transmission section for outputting the output from the planetary transmission section to a traveling device;

wherein said planetary transmission section is disposed downstream in the transmission direction relative to a pump and a motor that constitute said hydrostatic stepless speed changing section, and said planetary transmission section is configured to output a forward drive force both in case the hydrostatic stepless speed changing section is speed-changed to a forward rotation speed change state for outputting a drive force in a forward rotation direction and in case the hydrostatic stepless speed changing section is speed-changed to a reverse rotation speed change state for outputting a drive force in a reverse rotation direction;

wherein said traveling transmission section includes:

a speed range setting section operable to effect a change speed operation between a plurality of speed-changed transmission states wherein the forward drive force outputted from the planetary transmission section is sorted into one of a plurality of speed ranges and outputted from speed range setting section, and a neutral state wherein the drive force transmission is stopped, and a reverse transmission section operable to switch over between a reverse transmission state wherein the forward drive force outputted from the planetary transmission section is converted into a reverse drive force and outputted from reverse transmission section, and a neutral state wherein the drive force transmission is stopped;

wherein said planetary transmission section includes a sun gear, a carrier and a ring gear, a sun gear coupled combined force output shaft coupled with the sun gear, a carrier coupled combined force output shaft coupled with the carrier and a ring gear coupled combined force output shaft coupled with the ring gear extending from said planetary transmission section in the opposite direction to said hydrostatic stepless speed changing section and rotatable relative to one another about a same axis;

wherein said speed range setting section includes:

a forward first speed transmission gear, a forward second speed transmission gear and a forward third speed transmission gear coupled in distribution respectively with said ring gear coupled combined force output shaft, said sun gear coupled combined force output shaft and said carrier coupled combined force output shaft, an output shaft supporting said forward first speed transmission gear, said forward second speed transmission gear and said forward third speed transmission gear, with said forward first speed transmission gear, said forward second speed transmission gear and said forward third speed transmission gear being rotatable relative to each other and with rotational axes thereof being juxtaposed linearly, a first speed clutch for coupling the forward first speed transmission gear to the output shaft to be rotatable therewith, a second speed clutch for coupling the forward second speed transmission gear to the output shaft to be rotatable therewith, and a third speed clutch for coupling the forward third speed transmission gear to the output shaft to be rotatable therewith;

wherein said reverse transmission section includes:

a reverse transmission gear coupled via a reverse gear to one of a combined force output shaft coupled to said ring gear and a further combined force output shaft coupled to said carrier, said one combined force output shaft being coupled also to said forward first speed transmission gear; and a reverse transmission clutch for coupling said reverse transmission gear to said output shaft to be rotatable therewith; and wherein said reverse transmission gear is supported to said output shaft to be rotatable relative thereto, with a rotation axis of said reverse transmission gear being juxtaposed linearly with rotation axes of said forward first speed transmission gear, said forward second speed transmission gear and said forward third speed transmission gear.

With the above-described arrangement, as the reverse transmission clutch is switched into the disengaged state and also the hydrostatic stepless speed changing section is speed-change controlled, the first speed clutch, the second speed clutch and the third speed clutch are appropriately controlled to the engaged state or disengaged state. Whereby, the forward drive force, outputted from the planetary transmission section by combining the drive force from the engine and the drive force from the hydrostatic stepless speed changing section, is provided in one of the three speed ranges from the first speed range to the third speed range and steplessly speed-changed in that speed range, and the resultant forward drive force is outputted from the output shaft as a steplessly speed-changed forward drive force. When the reverse transmission clutch is switched into the engaged state and the first speed clutch, the second speed clutch and the third speed clutch are maintained under the disengaged states irrespectively of a speed change operation of the hydrostatic stepless speed changing section, the forward drive force outputted from the planetary transmission section, as a result of combining the drive force from the engine and the drive force from the hydrostatic stepless speed changing section, is converted into a reverse drive force by the reverse transmission clutch and outputted as such from the output shaft and this reverse drive force is transmitted to the traveling device.

The planetary transmission section includes a sun gear, a carrier and a ring gear. And, a sun gear coupled combined force output shaft coupled with the sun gear, a carrier coupled combined force output shaft coupled with the carrier and a ring gear coupled combined force output shaft coupled with the ring gear are caused to extend from the planetary transmission section in the opposite direction to the hydrostatic stepless speed changing section and rotatable relative to one another about a same axis. Further, the speed range setting section includes a forward first speed transmission gear, a forward second speed transmission gear and a forward third speed transmission gear coupled in distribution respectively with the ring gear coupled combined force output shaft, the sun gear coupled combined force output shaft and the carrier coupled combined output force; an output shaft supporting the forward first speed transmission gear, the forward second speed transmission gear and the forward third speed transmission gear, with the forward first speed transmission gear, the forward second speed transmission gear and the forward third speed transmission gear being rotatable relative to the output shaft, and with rotational axes thereof being juxtaposed linearly; a first speed clutch for coupling the forward first speed transmission gear to the output shaft to be rotatable therewith; a second speed clutch for coupling the forward second speed transmission gear to the output shaft to be rotatable therewith; and a third speed clutch for coupling the forward third speed transmission gear to the output shaft to be rotatable therewith. Therefore, in the switchover between the first speed range and the second speed range, the clutch disengagement can be controlled such that the first speed clutch and the second speed clutch are switched over from one of the engaged state and the disengaged state to the other after process of both the first speed clutch and the second speed clutch being engaged. And, also in the switchover between the second speed range and the third speed range, the clutch disengagement can be controlled such that the second speed clutch and the third speed clutch are switched over from one of the engaged state and the disengaged state to the other after process of both the second speed clutch and the third speed clutch being engaged. Hence, these speed change operations at the switching point between the first speed range and the second speed range and the switching point between the second speed range and the third speed range can be effected without occurrence of any interruption in the output.

With the above-described arrangement, the first speed clutch, the second speed clutch, the third speed clutch and the reverse transmission clutch can be disposed altogether on the same output shaft on a side of the planetary transmission section remote from the hydrostatic stepless speed changing section. Hence, the operational mechanisms for engaging and disengaging the respective clutches can be disposed altogether at the position located downstream in the transmission direction relative to the planetary transmission section.

Accordingly, the stepless speed change of the forward drive force is effected to the traveling device in the wide speed range extending over the three states of speed ranges, and both in the speed change switchover point between the first speed range and the second speed range and in the speed change switchover point between the second speed range and the third speed range, these speed change operations can be effected without occurrence of any interruption in the output and thus the traveling speed can be smoothly changed readily to suit a work or a traveling location. At the same time, a reverse drive force can be transmitted to the traveling device with the provision of the reverse transmission section alone, without providing the hydrostatic stepless speed changing section with the function of realizing a reverse drive force. As a result, reverse traveling can be provided with good transmission efficiency and inexpensively. Further, as the operational mechanisms for the respective clutches can be assembled in a compact manner, the apparatus can be obtained inexpensively in this respect too.

A fourth aspect of the present invention is as under.

Said speed range setting section further includes:

a forward fourth speed gear coupled to one of said ring gear coupled combined force output shaft, said sun gear coupled combined force output shaft and said carrier coupled combined force output shaft, said one combined force output shaft being not coupled to said forward third speed transmission gear, said forward fourth speed gear being supported on said output shaft to be rotatable relative thereto, and a fourth speed clutch for coupling the forward fourth speed transmission gear to the output shaft to be rotatable therewith.

With the above-described arrangement, the fourth speed clutch is controlled to be switched over appropriately in operative combination with the switchover control of the first speed clutch, the second speed clutch and the third speed clutch in association with the speed change control of the hydrostatic stepless speed changing section. Accordingly, the forward drive force outputted from the planetary transmission section, as the result of combining the drive force from the engine and the drive force from the hydrostatic stepless speed changing section, is provided in one of the four stages of speed ranges from the first speed range to the fourth speed range and steplessly speed-changed in the speed range and outputted as the forward drive force from the output shaft. So that, a forward drive output steplessly speed-changed in each speed range from the first speed range to the fourth speed range is transmitted to the traveling device.

Besides above, the speed range setting section further includes: a forward fourth speed gear coupled to one of said ring gear coupled combined force output shaft, said sun gear coupled combined force output shaft and said carrier coupled combined force output shaft that is not coupled to said forward third speed transmission gear, said forward fourth speed gear being supported on said output shaft to be rotatable relative thereto; and a fourth speed clutch for coupling the forward fourth speed transmission gear to the output shaft to be rotatable therewith. Thus, the clutch disengagement control can be effected such that the third speed clutch and the fourth speed clutch are switched over from one of the engaged state and the disengaged state to the other after the process of both the third speed clutch and the fourth speed clutch being engaged. As a result, the speed change at the switchover point between the third speed range and the fourth speed range can be effected without occurrence of any output interruption. Further, the operational mechanism for disengaging the fourth speed clutch, together with the operational mechanisms for disengaging the first through third speed clutches, can be disposed at the position located downstream in the transmission direction relative to the planetary transmission section.

Therefore, the stepless speed change of the forward drive force is effected to the traveling device in the wide speed range extending over the four stages of speed ranges. In addition to the speed change switchover between the first and second speed ranges and the speed change switchover between the second and third speed ranges, the speed change switchover operation between the third speed range and the fourth speed range can be effected without occurrence of any interruption in the output, and the traveling speed can be smoothly changed readily to suit a work or a traveling location. Further, as the operational mechanisms for the fourth speed clutch together with the operational mechanisms for the first through third speed clutches can be assembled in a compact manner, the apparatus can be obtained inexpensively in this respect too.

Further and other characterizing features of the present invention and advantages resulting therefrom will become apparent upon reading the following detailed description with reference to the accompanying drawings.

MODES FOR CARRYING OUT THE INVENTION

[First Embodiment]

A first embodiment of the present invention will be described first with reference to FIGS. 1-8.

Figure 1:
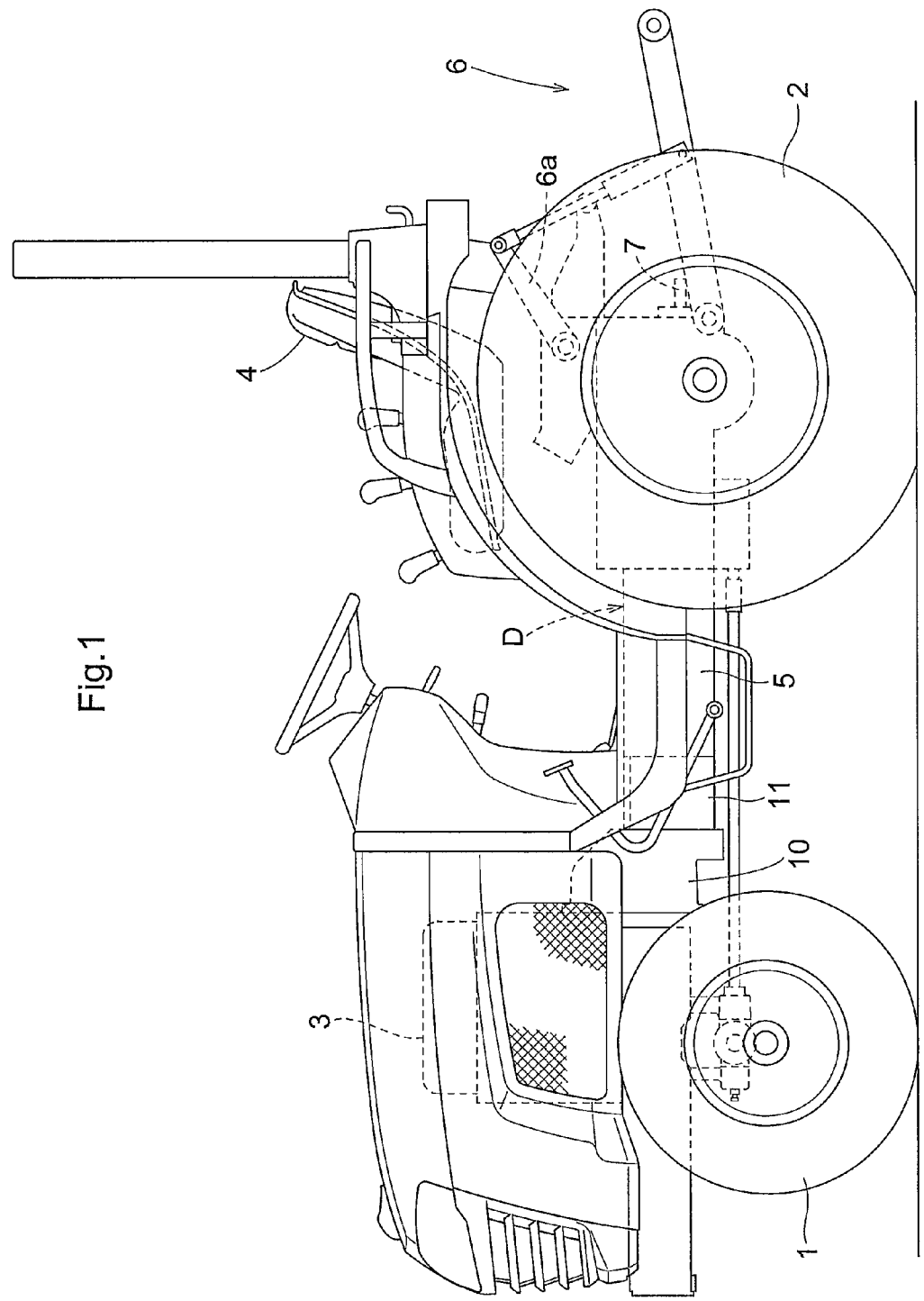
FIG. 1 is a side view showing a tractor relating to a first embodiment in its entirety.

FIG. 1 is a side view showing a tractor in its entirety. As shown in this figure, the tractor comprises a self-propelled vehicle self-propelled by a pair of right and left steerable and drivable front wheels 1, 1 and a pair of right and left drivable rear wheels 2, 2; an engine section provided at a front portion of the vehicle body of this self-propelled vehicle and mounting an engine 3; a riding type driving section provided at a rear portion of the vehicle body and mounting a driver's seat 4; a link mechanism 6 having a pair of right and left lift arms 6a, 4a pivotally and liftably attached to a transmission case constituting the rear portion a vehicle body frame 5 of the self-propelled vehicle; and a power takeoff (PTO) shaft 7 protruding from the transmission case rearwardly of the vehicle body.

In this tractor, a rotary tiller device is operably coupled to a rear portion of the vehicle body via a link mechanism 6, so that the tiller device may be lifted up/down. In operation, as a drive force outputted from the engine 3 is transmitted via the PTO shaft 7 to the rotary tiller device, for example, the tractor constitutes a riding type tiller machine. In this way, the tractor can constitute various kinds of riding type work machines with operative attachments of various work implements to the rear portion of the vehicle body, with the implements being attached to be liftable and drivable.

Figure 2:
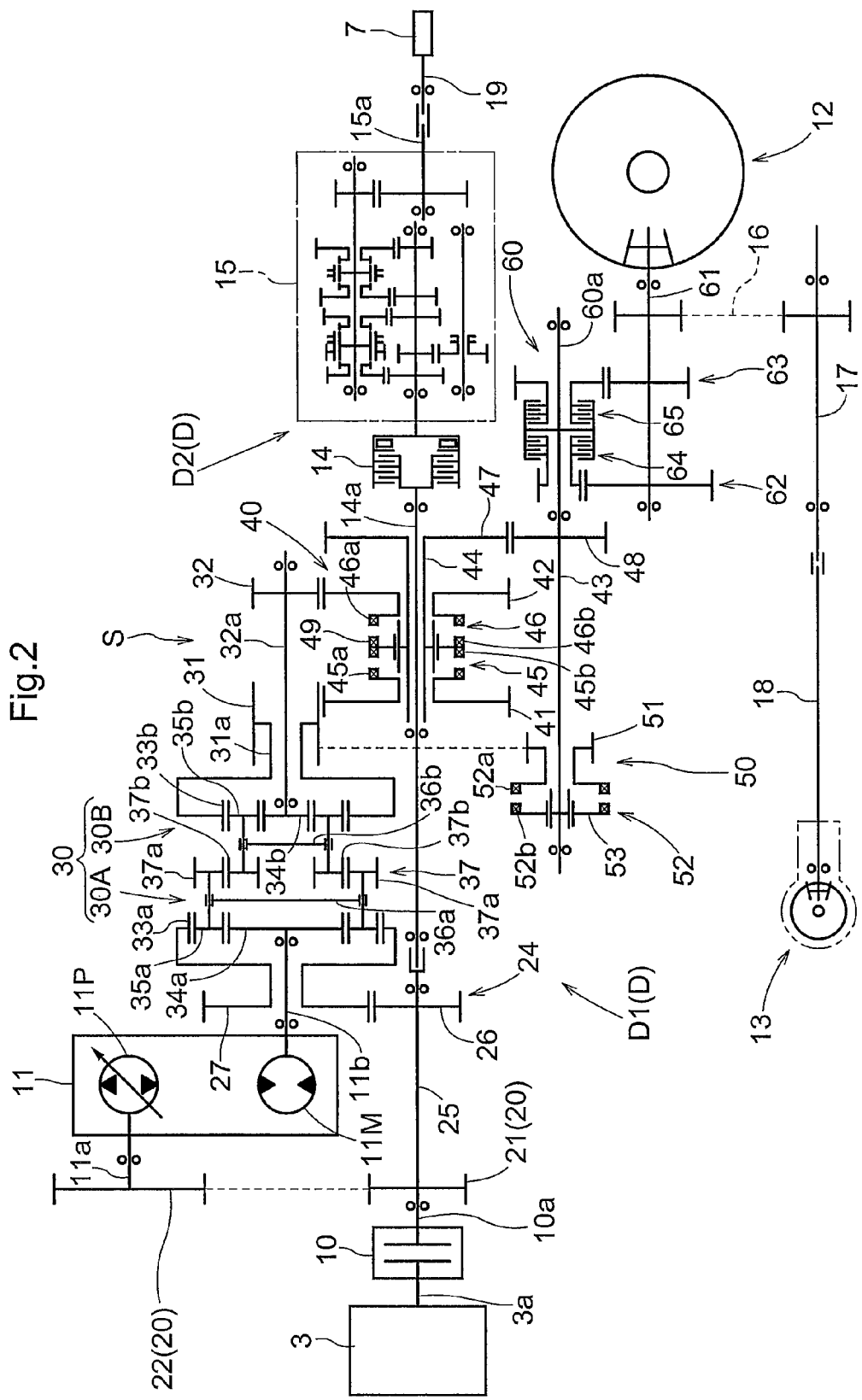
FIG. 2 is a skeleton showing a transmission apparatus.

FIG. 2 is a skeleton showing a transmission apparatus D mounted on the self-propelled vehicle so as to transmit the drive force outputted from the engine 3 to the pair of right and left front wheels 1, 1 and the pair of right and left rear wheels 2, 2, together constituting a traveling device, and to the PTO shaft 7. As shown in this figure, the transmission apparatus D includes a traveling transmission apparatus section D1 wherein the drive force from an output shaft 3a of the engine 3 is inputted from an output shaft 10a of a main clutch mechanism 10 provided rearwardly of the engine 3 to a hydrostatic stepless speed changing section 11 and a planetary transmission section 30 and the force from this planetary transmission section 30 is transmitted to a traveling transmission section S and then from this traveling transmission section S to a rear wheel differential mechanism 12 and a front wheel differential mechanism 13 to be transmitted eventually to the pair of right and left rear wheels 2, 2 and the pair of right and left front wheels 1, 1; and a work transmission apparatus section D2 wherein the drive force from the output shaft 3a of the engine 3 is inputted from the output shaft 10a of the main clutch mechanism 10 to a work clutch 14 via a rotary transmission shaft 25 and a rotary transmission shaft 14a to a work clutch 14 and the force from this work clutch 14 is transmitted to a work speed changing section 15 and then from this work speed changing section 15 to the PTO shaft 7.

The work speed changing section 15 is capable of changing speed into a plurality of stages of speeds by means of a plurality of shift gears and transmitting, from an output shaft 15a via the work transmission shaft 19, the speed-changed drive force inputted from the work clutch 14 to the PTO shaft 7.

The traveling transmission apparatus section D1 will be described next.

As shown in FIG. 2, the traveling transmission apparatus section D1 includes a hydrostatic stepless speed changing section 11 having its input shaft 11a operably coupled via an input gear mechanism 20 to an output shaft 10a of the main clutch mechanism 10; the planetary transmission section 30 having an input side ring gear 33a operably coupled via a planetary coupling mechanism 24 to the output shaft 10a of the main clutch mechanism 10; and the traveling transmission section S configured to input from the planetary transmission section 30 to either a speed range setting section 40 or a reverse transmission section 50, and to transmit power from an output shaft 43 via an auxiliary speed changing section 60 to the rear wheel differential mechanism 12 and the front wheel differential mechanism 13 in the case of whichever input to the speed range setting section 40 or the reverse transmission section 50.

The input gear mechanism 20 for operably coupling the output shaft 10a of the main clutch mechanism 10 to the input shaft 11a of the hydrostatic stepless speed changing section 11 includes an output shaft gear 21 mounted on the output shaft 10a of the main clutch mechanism 10 to be rotatable therewith; and an input shaft gear 22 meshed with this output shaft gear 21 and mounted on the input shaft 11a of the hydrostatic stepless speed changing section 11 to be rotatable therewith.

The planetary coupling mechanism 24 operably coupling the output shaft 10a of the main clutch mechanism 10 to the input side ring gear 33a of the planetary transmission section 30 includes: a rotational transmission shaft 25 formed to be rotatable together with the output shaft 10a of the main clutch mechanism 10; a transmission gear 26 mounted on this rotational transmission shaft 25 to be rotatable therewith; and an input gear 27 meshed with the transmission gear 26 and provided on the input side ring gear 33a to be rotatable therewith. The input gear 27, together with the input side ring gear 33a, is supported on a motor shaft 11b of the hydrostatic stepless speed changing section 11 to be rotatable relative thereto.

The hydrostatic stepless speed changing section 11 includes a hydraulic pump 11P having the input shaft 11a as a pump shaft thereof; and a hydraulic motor 11M connected to this hydraulic pump 11P via a drive circuit. The hydraulic pump 11P is constructed as an axial plunger, variable displacement type hydraulic pump and the hydraulic motor 11M is constructed as an axial plunger type hydraulic motor.

Accordingly, with this hydrostatic stepless speed changing section 11 in operation, the hydraulic pump 11P is driven by a drive force inputted from the engine 3 to the input shaft 11a via the input gear mechanism 20 and the main clutch mechanism 10, so that the hydraulic pump 11P supplies a hydraulic pressure to the hydraulic motor 11M, whereby the motor 11M is driven to output a force via its motor shaft 11b. The hydrostatic stepless speed changing section 11 is speed-changed into a forward rotation speed state, a neutral state or a reverse rotation speed state, in response to an operation of changing a swash plate angle of the hydraulic pump 11P. When speed-changed into the forward rotation speed state, the drive force in the forward rotation direction is outputted from the motor shaft 11b. When speed-changed into the neutral state, the output from the motor shaft 11b is stopped. When speed-changed into the reverse rotation speed state, the drive force in the reverse rotation direction is outputted from the motor shaft 11b. The hydrostatic stepless speed changing section 11, whether speed-changed into the forward rotation speed state or the reverse rotation speed state, operates to steplessly change the output speed from the motor shaft 11b in response to an operation of changing the swash plate angle of the hydraulic pump 11P.

The planetary transmission section 30 includes an input side planetary gear mechanism 30A having an input side sun gear 34a coupled to the motor shaft 11b of the hydrostatic stepless speed changing section 11 to be rotatable therewith and an input side ring gear 33a operably coupled to the rotational transmission shaft 25 via the planetary coupling mechanism 24; and an output side planetary transmission mechanism 30B disposed downstream of the input side planetary gear mechanism 30A in the transmission direction. An input side carrier 36a supporting the input side planetary gear 35a of the input side planetary gear mechanism 30A and an output side carrier 36b supporting the output side planetary gear 35b of the output side planetary gear mechanism 30B are formed as an integral carrier. That is, the planetary transmission section 30 is comprised of a composite planetary gear mechanism consisting: the pair of planetary gear mechanisms including the input side planetary gear mechanism 30A and the output side planetary gear mechanism 30B; and the gear coupling mechanism 37 for operably coupling the input side planetary gear 35a constituting the input side planetary gear mechanism 30A to the output side planetary gear 36b constituting the output side planetary gear mechanism 30B. The gear coupling mechanism 37 is comprised of meshing operable coupling between a gear 37a formed integral with the input side planetary gear 35a to have a continuous construction with a same outer diameter as this input side planetary gear 35a, and a gear 37b formed integral with the output side planetary gear 35b to have a continuous construction with a same outer diameter as this output side planetary gear 35b. Alternatively, this gear coupling mechanism 37 can be comprised of operative coupling between a gear formed separately from the input side planetary gear 35a and coupled to this input side planetary gear 35a via a connecting shaft to be rotatable therewith, and a further gear formed separately from the output side planetary gear 35b and coupled to this output side planetary gear 35b via a connecting shaft to be rotatable therewith.

The planetary transmission section 30 includes a high speed side output gear 32 coupled to the output side sun gear 34b via the output shaft 32a to be rotatable therewith; and a low speed side output gear 31 coupled to the output side ring gear 33b via a cylindrical output shaft 31a to be rotatable therewith.

With this planetary transmission section 30 in operation, the drive force outputted from the engine 3 is inputted to the input side ring gear 33a via the main clutch mechanism 10 and the planetary coupling mechanism 24; the drive force outputted from the hydrostatic stepless speed changing section 11 via the motor shaft 11b is inputted to the input side sun gear 34a; then, the drive force inputted from the engine 3 and the drive force inputted from the hydrostatic stepless speed changing section 11 are combined and synthesized together by the input side planetary mechanism 30A and the output side planetary transmission mechanism 30B and the resultant combined (synthesized) drive force is outputted from the low speed side output gear 31 and the high speed side output gear 32. The planetary transmission section 30 does not combine or synthesize an reverse traveling drive force, whether the hydrostatic stepless speed changing section 11 is operated into the forward rotation speed state or the reverse rotation speed state, but combines or synthesizes only the forward traveling drive force and outputs this from the low speed side output gear 31 and the high speed side output gear 32.

The traveling transmission section S includes a speed range setting section 40 having a low speed side speed changing gear 41 meshed with the low speed side output gear 31 of the planetary transmission section 30 and a high speed side speed changing gear 42 meshed with the high speed side output gear 32 of the planetary transmission section 30; a reverse transmission section 50 having a reverse transmission gear 51 meshed with the low speed side output gear 31 of the planetary transmission section 30; and an auxiliary transmission section 60 having an input shaft 60a operably coupled to the output shaft 43 of the speed range setting section 40.

The speed range setting section 40 includes, in addition to the low speed side speed changing gear 41 and the high speed side speed changing gear 42, a counter shaft 44 in the form of a tubular shaft supporting the low speed side speed changing gear 41 and the high speed side speed changing gear 42 rotatable relative to each other; a low speed transmission clutch 45 provided between the low speed side speed changing gear 41 and the outer shaft 44; a high speed transmission clutch 46 provided between the high speed side speed changing gear 42 and the outer shaft 44; a counter gear 47 mounted at the rear end of the counter shaft 44 to be rotatable therewith; and an output shaft gear 48 meshed with the counter gear 47 and mounted on the output shaft 43 to be rotatable therewith.

The low speed transmission clutch 45 and the high speed transmission clutch 46 are provided with a clutch body 49 mounted on the counter shaft 44 to be rotatable therewith and slidable thereon, thereby together constituting a meshing type clutch mechanism. In operation, if the clutch body 49 is shifted along the counter shaft 44 toward the low speed side speed changing gear 41 thereby to realize meshing between a clutch pawl 45b provided in the clutch body 49 and a clutch pawl 45a provided at a lateral portion of the low speed side speed changing gear 41, the low speed transmission clutch 45 is operated into the engaged state to couple the low speed side speed changing gear 41 to the counter shaft 44 to be rotatable therewith.

Further, if the clutch body 49 is shifted along the counter shaft 44 away from the low speed side speed changing gear 41 thereby to realize detachment between the clutch pawl 45b of the clutch body 49 and the clutch pawl 45a of the low speed side speed changing gear 41, the low speed transmission clutch 45 is operated into the disengaged state to render the low speed side speed changing gear 41 rotatable relative to the counter shaft 44.

Referring now to the operations of the high speed transmission clutch 46, if the clutch body 49 is shifted along the counter shaft 44 toward the high speed side speed changing gear 42 thereby to realize meshing between a clutch pawl 46b provided in the clutch body 49 and a clutch pawl 46a provided at a lateral portion of the high speed side speed changing gear 42, the high speed transmission clutch 46 is operated into the engaged state to couple the high speed side speed changing gear 42 to the counter shaft 44 to be rotatable therewith.

Referring further to the operations of the high speed transmission clutch 46, if the clutch body 49 is shifted along the counter shaft 44 away from the high speed side speed changing gear 42 thereby to realize detachment between the clutch pawl 46b of the clutch body 49 and the clutch pawl 46a of the high speed side speed changing gear 42, the high speed transmission clutch 46 is operated into the disengaged state to render the high speed side speed changing gear 42 rotatable relative to the counter shaft 44.

Therefore, with the speed range setting section 40 in operation, when the low speed transmission clutch 45 is switched over into the engaged state and the high speed transmission clutch 46 is switched over into the disengaged state, the speed range setting section 40 sets a first speed range setting state, wherein the forward traveling drive force outputted by the planetary transmission section 30 from the low speed side output gear 31 is transmitted to the output shaft 43 via the low speed side speed changing gear 41, the low speed transmission clutch 45, the counter shaft 44, the counter gear 47 and the output shaft gear 48, so that the force is transmitted as it is as the forward traveling drive force from the output shaft 43 to the auxiliary speed changing section 60.

Further, with the speed range setting section 40 in operation, when the high speed transmission clutch 46 is switched over into the engaged state and the low speed transmission clutch 45 is switched over into the disengaged state, the speed range setting section 40 sets a second speed range setting state, wherein the forward traveling drive force outputted by the planetary transmission section 30 from the high speed side output gear 32 is transmitted to the output shaft 43 via the high speed side speed changing gear 42, the high speed transmission clutch 46, the counter shaft 44, the counter gear 47 and the output shaft gear 48, so that the force is transmitted as it is as the forward traveling drive force from the output shaft 43 to the auxiliary speed changing section 60.

Further, if the low speed transmission clutch 45 and the high speed transmission clutch 46 are switched into the disengaged states, the speed range setting section 40 provides a neutral state, wherein the force transmission from the planetary transmission section 30 to the auxiliary speed change section 60 is stopped.

The reverse transmission section 50 includes, in addition to the reverse transmission gear 51, a reverse transmission clutch 52 provided between the output shaft 43 of the speed range setting section 40 rotatably supporting the reverse transmission gear 51, and this reverse transmission gear 51.

The reverse transmission clutch 52 includes a clutch body 53 provided on the output shaft 43 to be rotatable therewith and slidable relative thereto, thus constituting a meshing type clutch mechanism. With this reverse transmission clutch 52 in operation, if the clutch body 53 is shifted along the output shaft 43 to realize meshing between a clutch pawl 52b provided in the clutch body 53 and a clutch pawl 52a provided at a lateral portion of the reverse transmission gear 61, the reverse transmission clutch 52 is operated into the engaged state to couple the reverse transmission gear 51 to the output shaft 43 to be rotatable therewith. Referring further to the operations of the reverse transmission clutch 52, if the clutch body 53 is shifted along the output shaft 43 thereby to realize detachment between the clutch pawl 52b of the clutch body 53 and the clutch pawl 52a of the reverse transmission gear 51, the reverse transmission clutch 52 is operated into the disengaged state to render the reverse transmission gear 51 rotatable relative to the output shaft 43.

With the reverse transmission section 50, when the reverse transmission clutch 52 is switched over into the engaged state, the forward traveling drive force outputted by the planetary transmission section 30 from the low speed side output gear 31 is converted into a reverse traveling drive force by the reverse transmission gear 41 and the reverse transmission clutch 52; and this reverse traveling drive force is transmitted to the output shaft 43 and then from this output shaft 43 to the auxiliary speed changing section 60.

When the reverse transmission clutch 52 is switched over into the disengaged state, the reverse transmission section 50 is brought into the neutral state, wherein the force transmission from the planetary transmission section 30 to the auxiliary speed changing section 60 is stopped.

The auxiliary speed changing section 60 includes, in addition to the input shaft 60a, an output shaft 61 having a rear end thereof coupled to an input gear of the rear wheel differential mechanism 12; and a low speed transmission mechanism 62 and a high speed transmission mechanism 63 provided between the output shaft 61 and the input shaft 60a. The output shaft 61 is operably coupled to an input gear of the front wheel differential mechanism 13 via a gear coupling mechanism 15, a front wheel output shaft 17 and a rotational shaft 18. The low speed transmission mechanism 62 includes a friction type low speed clutch 64 mounted on the input shaft 60a. The high speed transmission mechanism 63 includes a friction type high speed clutch 65 mounted on the input shaft 60a.

Referring now to the functions of the auxiliary speed changing section 60, if the low speed clutch 64 is switched over into the engaged state and the high speed clutch 65 is switched over into the disengaged state, the forward traveling drive force transmitted to the input shaft 60a from the speed range setting section 40 or the reverse traveling drive force transmitted to the input shaft 60a from the reverse transmission section 50 is transmitted via the low speed transmission mechanism 62 to the output shaft 61, and from this output shaft 61 to the rear wheel differential mechanism 12 and the front wheel differential mechanism 13, whereby a low speed state is realized.

Further, with this auxiliary speed changing section 60, if the high speed clutch 65 is switched over into the engaged state and the low speed clutch 64 is switched over into the disengaged state, the forward traveling drive force transmitted to the input shaft 60a from the speed range setting section 40 or the reverse traveling drive force transmitted to the input shaft 60a from the reverse transmission section 50 is transmitted via the high speed transmission mechanism 63 to the output shaft 61, and from this output shaft 61 to the rear wheel differential mechanism 12 and the front wheel differential mechanism 13, whereby a high speed state is realized.

Figures 3, 4:
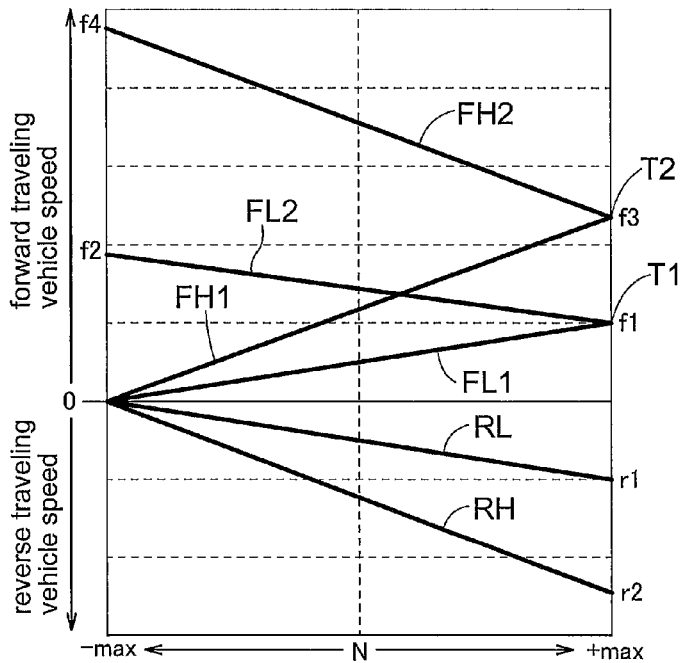
FIG. 3 is an explanatory view illustrating relationship between speed states of a hydrostatic stepless speed changing section and traveling speeds of a self-propelled vehicle.
FIG. 4 is an explanatory view illustrating relationship among speed states of an auxiliary speed changing section, operational states of a low speed transmission clutch, operational states of a high speed transmission clutch, operational states of a reverse transmission clutch, traveling directions of the self-propelled vehicle, speed ranges and speed modes.

FIG. 3 is an explanatory view illustrating relationship between speed states of the hydrostatic stepless speed changing section 11 which is accelerator-set for causing the engine 3 to output a drive force at a predetermined speed, and traveling speeds (vehicle speeds) of the self-propelled vehicle. The horizontal axis in FIG. 3 represents the speed states of the hydrostatic stepless speed changing section 11, the mark "N" on the horizontal axis denotes the neutral position of the hydrostatic stepless speed changing section 11, the mark "+max" on the horizontal axis denotes the highest speed position in the forward rotation speed state of the hydrostatic stepless speed changing section 11, and the mark "−max" on the horizontal axis denotes the highest speed position in the reverse rotation speed state of the hydrostatic stepless speed changing section 11. The vertical axis in FIG. 3 represents the vehicle speed. The mark "0" on the vertical axis denotes the zero vehicle speed. The upper portion of the vertical axis greater than "0" denotes forward traveling vehicle speed and the lower portion of the vertical axis smaller than"0" denotes reverse traveling vehicle speed.

The solid line FL1 shown in FIG. 3 represents vehicle speed change in the first speed range in the low speed mode in case the self-propelled vehicle is forwarded. The solid line FL2 shown in FIG. 3 represents vehicle speed change in the second speed range in the low speed mode in case the self-propelled vehicle is forwarded. The solid line FH1 shown in FIG. 3 represents vehicle speed change in the first speed range in the high speed mode in case the self-propelled vehicle is forwarded. The solid line FH2 shown in FIG. 3 represents vehicle speed change in the second speed range in the high speed mode in case the self-propelled vehicle is forwarded. The solid line RL shown in FIG. 3 represents vehicle speed change in the low speed mode in case the self-propelled vehicle is reversed. The solid line RH shown in FIG. 3 represents vehicle speed change in the high speed mode in case the self-propelled vehicle is reversed.

FIG. 4 is an explanatory view illustrating relationship among speed conditions of the auxiliary speed changing section 60, operational states of the low speed transmission clutch 45, operational states of the high speed transmission clutch 46, operational state of the reverse transmission clutch 52, traveling directions of the self-propelled vehicle and speed ranges and speed modes. The mark "L" shown in FIG. 4 represents the low speed state of the auxiliary speed changing section 60. The mark "H" shown in FIG. 4 represents the high speed state of the auxiliary speed changing section 60. The mark "ON" shown in FIG. 4 denotes engaged states of the low speed transmission clutch 45, the high speed transmission clutch 46 and the reverse transmission clutch 52. The mark "OFF" shown in FIG. 4 denotes disengaged states of the low speed transmission clutch 45, the high speed transmission clutch 46 and the reverse transmission clutch 52.

As shown in FIG. 4, when the auxiliary speed changing section 60 is speed-changed to the low speed state, the low speed mode is set. When the auxiliary speed changing section 60 is speed-changed to the high speed state, the high speed mode is set. When the reverse transmission clutch 52 is switched over into the disengaged state, the reverse transmission section 50 is switched over into the neutral state, thereby to realize a forward traveling transmission state. When the reverse transmission clutch 52 is switched over into the engaged state, the reverse transmission section 50 is switched over into the reverse transmission state, thereby to realize a reverse traveling transmission state.

As shown in FIG. 3 and FIG. 4, while the auxiliary speed changing section 60 is kept under the low speed state "L" and the reverse transmission clutch 52 is kept under the disengaged state "OFF" and while the low speed transmission clutch 45 is kept under the "OFF " state and the high speed transmission clutch 46 is kept under the "OFF" state, in association with change speed operation of the hydrostatic stepless speed changing section 11 from the highest speed position in the reverse rotation speed state "−max" to the highest speed position in the forward rotation state "+max", the forward traveling vehicle speed is progressively and steplessly increased from the zero speed "0" in the low speed mode in the first speed range (FL1). When the hydrostatic stepless speed changing section 11 reaches the highest speed position in the forward rotation speed state "+max", the forward vehicle speed enters the intermediate speed "f1" in the low speed mode. When the hydrostatic stepless speed changing section 11 reaches the highest speed position in the forward rotation speed state "+max", the process reaches a switchover point "T1" between the first speed range and the second speed range in the low speed mode. Simultaneously with the realization of this switchover point "T1", the low speed transmission clutch 45 is switched into the disengaged state "OFF" and also the high speed transmission clutch 46 is switched into the engaged state "ON". Thereafter, while the low speed transmission clutch 45 is kept at the disengaged state "OFF" and also the high speed transmission clutch 46 is kept at the engaged state "ON", as the hydrostatic stepless speed changing section 11 is speed-changed from the highest speed position in the forward rotation speed state "+max" to the highest speed position in the reverse rotation speed state "−max", the forward traveling vehicle speed is increased steplessly from "f1" to the second speed range in the low speed mode (FL2). When the hydrostatic stepless speed changing section 11 reaches the highest speed position in the reverse rotation speed state "−max", the forward traveling vehicle speed become the highest speed "f2" in the low speed mode.

While the auxiliary speed changing section 60 is kept under the high speed state "H" and the reverse transmission clutch 52 is kept under the disengaged state "OFF" and while the low speed transmission clutch 45 is kept under the engaged state "ON" state and the high speed transmission clutch 45 is kept under the disengaged state "OFF", in association with change speed operation of the hydrostatic stepless speed changing section 11 from the highest speed position in the reverse rotation speed state "−max" to the highest speed position in the forward rotation state "+max", the forward traveling vehicle speed is progressively and steplessly increased from the zero speed "0" in the high speed mode in the first speed range (FL1). When the hydrostatic stepless speed changing section 11 reaches the highest speed position in the forward rotation speed state "+max", the forward vehicle speed enters the intermediate speed "f3" in the high speed mode. When the hydrostatic stepless speed changing section 11 reaches the highest speed position in the forward rotation speed state "+max", the process reaches a switchover point "T2" between the first speed range and the second speed range in the high speed mode. Simultaneously with the realization of this switchover point "T2", the low speed transmission clutch 45 is switched into the disengaged state "OFF" and also the high speed transmission clutch 46 is switched into the engaged state "ON". Thereafter, while the low speed transmission clutch 45 is kept at the disengaged state "OFF" and also the high speed transmission clutch 46 is kept at the engaged state "ON", as the hydrostatic stepless speed changing section 11 is speed-changed from the highest speed position in the forward rotation speed state "+max" to the highest speed position in the reverse rotation speed state "−max", the forward traveling vehicle speed is increased steplessly from "f3" to the second speed range in the low speed mode (FL2). When the hydrostatic stepless speed changing section 11 reaches the highest speed position in the reverse rotation speed state "−max", the forward traveling vehicle speed become the highest speed in the high speed mode "f4".

While the auxiliary speed changing section 60 is kept under the low speed state "L" and the reverse transmission clutch 52 is kept under the engaged state "ON" and while the low speed transmission clutch 45 is kept under the disengaged state "OFF" state and the high speed transmission clutch 46 is kept under the disengaged state "OFF", in association with change speed operation of the hydrostatic stepless speed changing section 11 from the highest speed position in the reverse rotation speed state "−max" to the highest speed position in the forward rotation state "+max", the reverse traveling vehicle speed is progressively and steplessly increased from the zero speed "0" in the low speed mode (RL). When the hydrostatic stepless speed changing section 11 reaches the highest speed position in the forward rotation speed state "+max", the reverse traveling vehicle speed become the highest speed in the high speed mode "r1".

While the auxiliary speed changing section 60 is kept under the high speed state "H" and the reverse transmission clutch 45 is kept under the engaged state "ON" and while the low speed transmission clutch 45 is kept under the disengaged state "OFF" state and the high speed transmission clutch 46 is kept under the disengaged state "OFF", in association with change speed operation of the hydrostatic stepless speed changing section 11 from the highest speed position in the reverse rotation speed state "−max" to the highest speed position in the forward rotation state "+max", the reverse traveling vehicle speed is progressively and steplessly increased from the zero speed "0" in the high speed mode (RH). When the hydrostatic stepless speed changing section 11 reaches the highest speed position in the forward rotation speed state "+max", the reverse traveling vehicle speed becomes the highest speed in the high speed mode "r2". Incidentally, the transmission ratio from the low speed side output gear 31 via the low speed transmission clutch 45 to the output shaft 61 is set equal to the transmission ratio from the low speed side output gear 31 via the reverse transmission section 50 to the output shaft 61 so that the change ratio (magnitude of the inclination) of the first speed range FL1 in the low speed mode at the time of forwarding in FIG. 3 may be equal to the change ratio of the low speed mode RL at the time of reversing, and so that the change ratio (magnitude of the inclination) of the first speed range FH1 in the high speed mode at the time of forwarding may be equal to the change of ratio of the high speed mode RH at the time of reversing.

Figure 5:
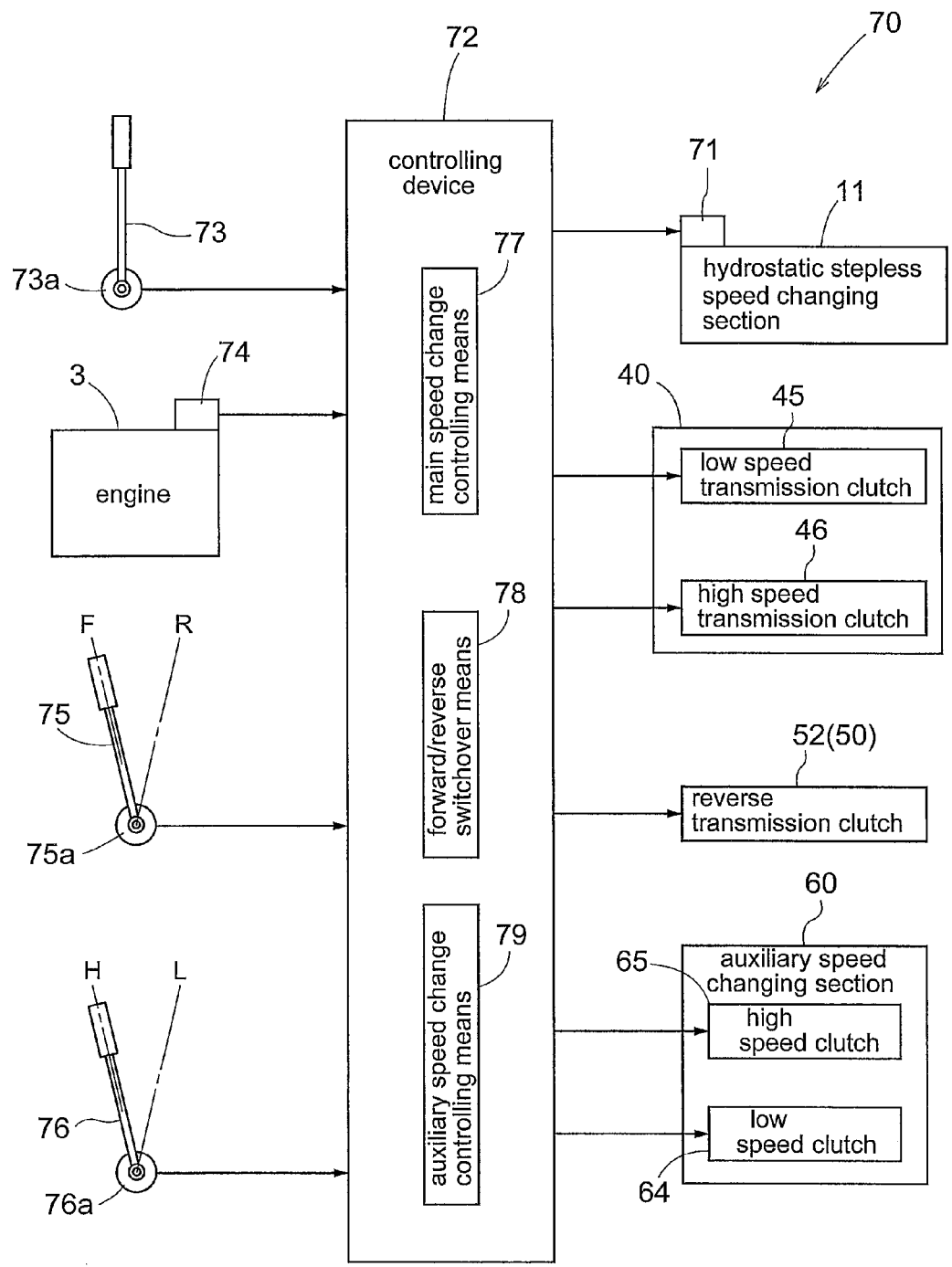
FIG. 5 is a block diagram showing a speed changing device.

FIG. 5 is a block diagram showing a speed change operating apparatus 70 for speed changing the traveling transmission apparatus section D1. As shown in this figure, the speed change operating apparatus 70 includes: a controlling device 72 operably coupled respectively with a speed change operating section 71 provided in the hydrostatic stepless speed changing section 11 for effecting swash plate angle change of the hydraulic pump 11P, a switching section (not shown) for the low speed transmission clutch 45 and the high speed transmission clutch 46 of the speed range setting section 40, a switching section (shown) for the reverse transmission clutch 52 of the reverse transmission section 50, switching portions (not shown) of the high speed clutch 65 and the low speed clutch 64 of the auxiliary speed changing section 60; a speed changing lever 73; an engine rotation sensor 74 for detecting output speed of the engine 3; a forward/reverse lever 75; and an auxiliary speed changing lever 76.

The speed changing lever 73 is operably coupled to the controlling device 72 via a speed change detecting sensor 73a coupled to the speed changing lever 73. The speed change detecting sensor 73a is constituted from a rotation potentiometer having its rotation operational portion coupled to the speed changing lever 73 for detecting an operational position of the speed changing lever 73 and outputting the result of this detection to the controlling device 72.

The forward/reverse lever 75 is operably coupled to the controlling device 72 via a forward/reverse detection sensor 75a coupled to the forward/reverse lever 75. The forward/reverse detection sensor 75a is constituted from a rotation potentiometer having its rotation operational portion coupled to the forward/reverse lever 75 for detecting an operational position of the forward/reverse lever 75 and outputting the result of this detection to the controlling device 72.

The auxiliary speed changing lever 76 is operably coupled to the controlling device 72 via an auxiliary speed changing detection sensor 76a coupled to the auxiliary speed changing lever 76. The auxiliary speed changing detection 76a is constituted from a rotation potentiometer having its rotation operational portion coupled to the auxiliary speed changing 76 for detecting an operational position of the auxiliary speed changing 76 and outputting the result of this detection to the controlling device 72.

The controlling device 72 is constructed by utilizing a microcomputer and includes a main speed change controlling means 77, a forward/reverse switchover means 78 and an auxiliary speed change controlling means 79.

The main speed change controlling means 77 detects, based on the detection information of the engine rotation sensor 74, an output speed of the engine 3 under a condition of the engine 3 being set for acceleration and judges the operational position of the speed change lever 73 based upon the detection information of the speed change detecting sensor 73a. Then, based upon the detected output speed of the engine 3, the judged operational position of the speed changing lever 73 and the command from the forward/reverse detecting sensor 75a, the main speed change controlling means 77 effects automatic speed change control of the hydrostatic stepless speed changing section 11 so that a predetermined forward traveling vehicle speed or reverse traveling vehicle speed corresponding to the operational positions of the speed changing lever 73 and the forward/reverse lever 75 and effects also automatic switchover control of the low speed transmission clutch 45 and the high speed transmission clutch 46.

In response to an operation of the forward/reverse lever 75 to the forward position "F", the forward/reverse switchover means 78 automatically switches over the reverse transmission clutch 62 to the disengaged "OFF" state based upon the detection information of the forward/reverse detecting sensor 75a. In response to an operation of the forward/reverse lever 75 to the reverse position "R", the forward/reverse switchover means 78 automatically switches over the reverse transmission clutch 52 to the engaged "ON" state based upon the detection information of the forward/reverse detecting sensor 75a.

In response to an operation of the auxiliary speed change lever 76 to the high speed position "H", the auxiliary speed change controlling means 79 automatically switches over the high speed clutch 65 to the engaged state and automatically switches over the low speed clutch 64 to the disengaged state, based upon the detection information of the auxiliary speed change detecting sensor 76a, whereby the auxiliary speed changing section 60 is speed-changed to the high speed state "H". In response to an operation of the auxiliary speed change lever 76 to the low speed position "L", the auxiliary speed change controlling means 79 automatically switches over the high speed clutch 65 to the disengaged state and automatically switches over the low speed clutch 64 to the engaged state, based upon the detection information of the auxiliary speed change detecting sensor 76a, whereby the auxiliary speed changing section 60 is speed-changed to the low speed state "L".

[Alternative Embodiment of First Embodiment]

Figure 6:
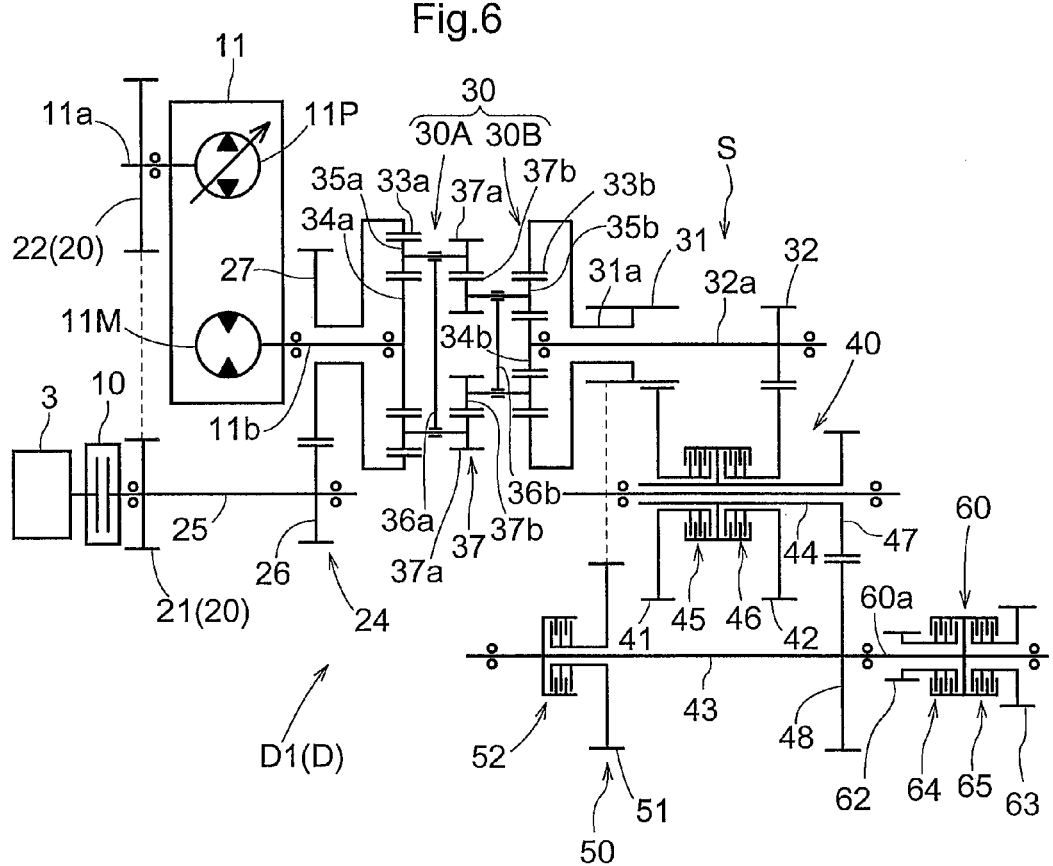
FIG. 6 is a skeleton showing a traveling transmission device having an alternative construction.

FIG. 6 is a skeleton view of a traveling transmission apparatus section D1 having an alternatively embodied construction. As shown in this figure, in the case of this traveling transmission apparatus section D1 having an alternatively embodied construction, the apparatus has different arrangements than the transmission apparatus section D1 of the above-described embodiment in the respects of the speed range setting section 40 and the reverse transmission section 50 and has the same arrangements as the transmission apparatus section D1 of the above-described embodiment in the other respects.

In the case of the traveling transmission apparatus section D1 having an alternatively embodied construction, the low speed transmission clutch 45 and the high speed transmission clutch 46 constituting the speed range setting section 40, and the reverse transmission clutch 52 constituting the reverse transmission section 50 are comprised of multiple-plate type friction clutches.

Therefore, the switchover operations between the engaged state and the disengaged state of the low speed transmission clutch 45, the high speed transmission clutch 46 and the reverse transmission clutch 52 can be effected speedily and smoothly. And, the speed changes at the switching points "T1" and "T2" where the first speed range and the second speed range are switched over in the low speed mode and the high speed mode can be effected continuously without interruptions, and the switchover between the forward traveling and reverse traveling too can be effected smoothly.

Figure 7:
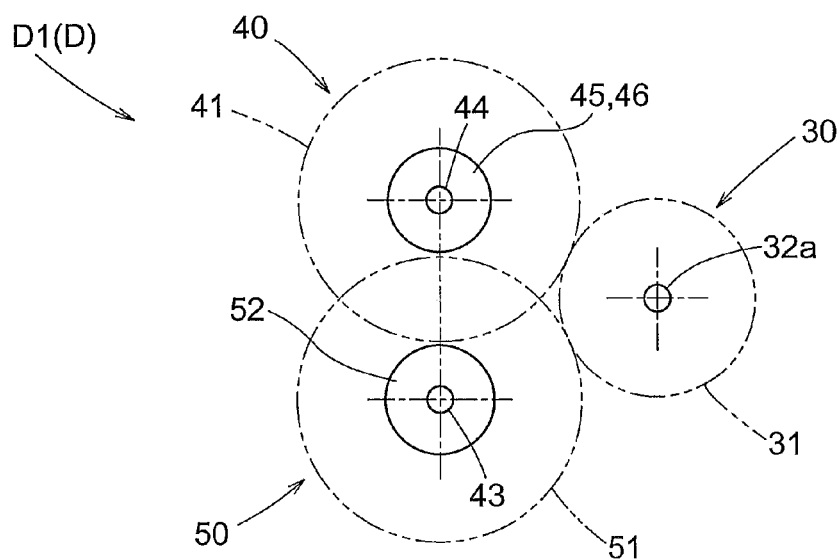
FIG. 7 is a front view showing gear layout of a speed range setting section and a reverse transmission section of a traveling transmission device having the alternative construction.

FIG. 7 is a front view showing a gear layout of the speed range setting section 40 and the reverse transmission section 50 in the traveling transmission apparatus section D1 having the alternatively embodied construction. As shown in this figure and also in FIG. 6, in the case of the traveling transmission apparatus section D1 having the alternatively embodied construction, a speed reduction transmission ratio in case the drive force outputted from the planetary transmission section 30 is transmitted in a reduced speed from the low speed side output gear 31 via the reverse transmission gear 51 and the reverse transmission clutch 52 to the output shaft 43 is set smaller than a speed reduction transmission ratio in case the drive force outputted from the planetary transmission section 30 is transmitted in a reduced speed from the low speed side output gear 31 via the low speed side speed changing gear 41 and the low speed transmission clutch 45, the counter shaft 44, the counter gear 47 and the output shaft gear 48 to the output shaft 43.

Figure 8:
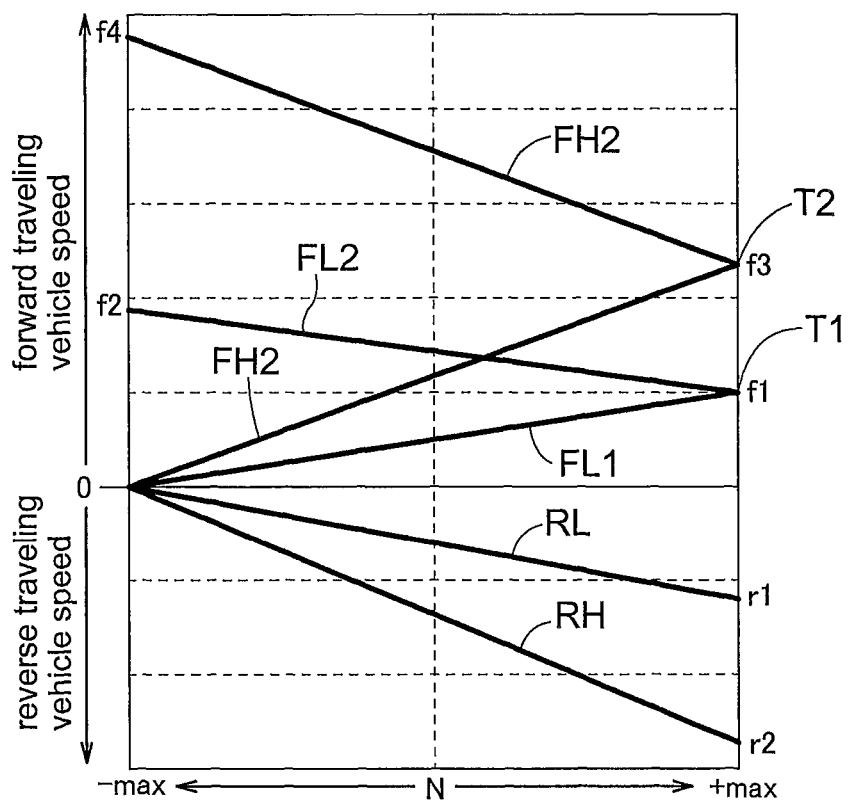
FIG. 8 is an explanatory view illustrating relationship among speed states of a hydraulic stepless speed changing section of a traveling transmission device having the alternative construction and traveling speeds of the self-propelled vehicle.

Therefore, as shown in FIG. 8, the range of vehicle speed change in the reverse low speed mode (RL) can be greater than the range of vehicle speed change in the first speed range (FL1) in the forward low speed mode. That is, the highest vehicle speed (r1) that can be realized in the case of a speed change operation in the reverse low speed mode (RL) is higher than the highest vehicle speed (f1) that can be realized in the case of a speed change operation in the forward low speed mode first speed range (FL1). And, the range of vehicle speed change in the reverse high speed mode (RH) can be greater than the range of vehicle speed change in the forward high speed mode first speed range (FH1). That is, the highest vehicle speed (r2) that can be realized in the case of a speed change operation in the reverse high speed mode (RH) is higher than the highest vehicle speed (f3) that can be realized in the case of a speed change operation in the forward high speed mode first speed range (FH1).

[Other Alternative Embodiments]

(1) In the foregoing embodiment, there was described an example in which the auxiliary speed changing section 60 is provided. The invention may be embodied without providing the auxiliary speed changing section 60.

(2) In the foregoing embodiment, there was described an example in which the planetary transmission section 30 is constituted from a composite planetary gear mechanism. Instead, planetary transmission section 30 can be constituted from a standard planetary gear mechanism having multiple stages of gear mechanisms.

(3) In the foregoing embodiment, there was described an example in which the front wheels 1 and the rear wheels 2 are provided as the traveling device. However, a crawler type traveling device can be provided instead of wheels.

(4) In the foregoing embodiment, there were described an example in which the low speed transmission clutch 45, the high speed transmission clutch 46 and the reverse transmission clutch 52 are constituted from meshing type clutches, and an example in which the low speed transmission clutch 45, the high speed transmission clutch 46 and the reverse transmission clutch 52 are constituted from multiple plate friction type clutches. Alternatively, one or more of the low speed transmission clutch 45, the high speed transmission clutch 46 and the reverse transmission clutch 52 can be constituted from a meshing type clutch(s) while the other can be constituted from a multiple plate friction clutch.

(5) The above-described transmission arrangement shown in FIG. 2 can be configured so as to provide the speed range ratios shown in FIG. 8. Or, the above-described transmission arrangement shown in FIG. 6 can be configured so as to provide the speed range ratios shown in FIG. 3.

[Second Alternative Embodiment]

Next, with reference to FIGS. 9-14, a second alternative embodiment of the present invention will be described.

Figure 9:
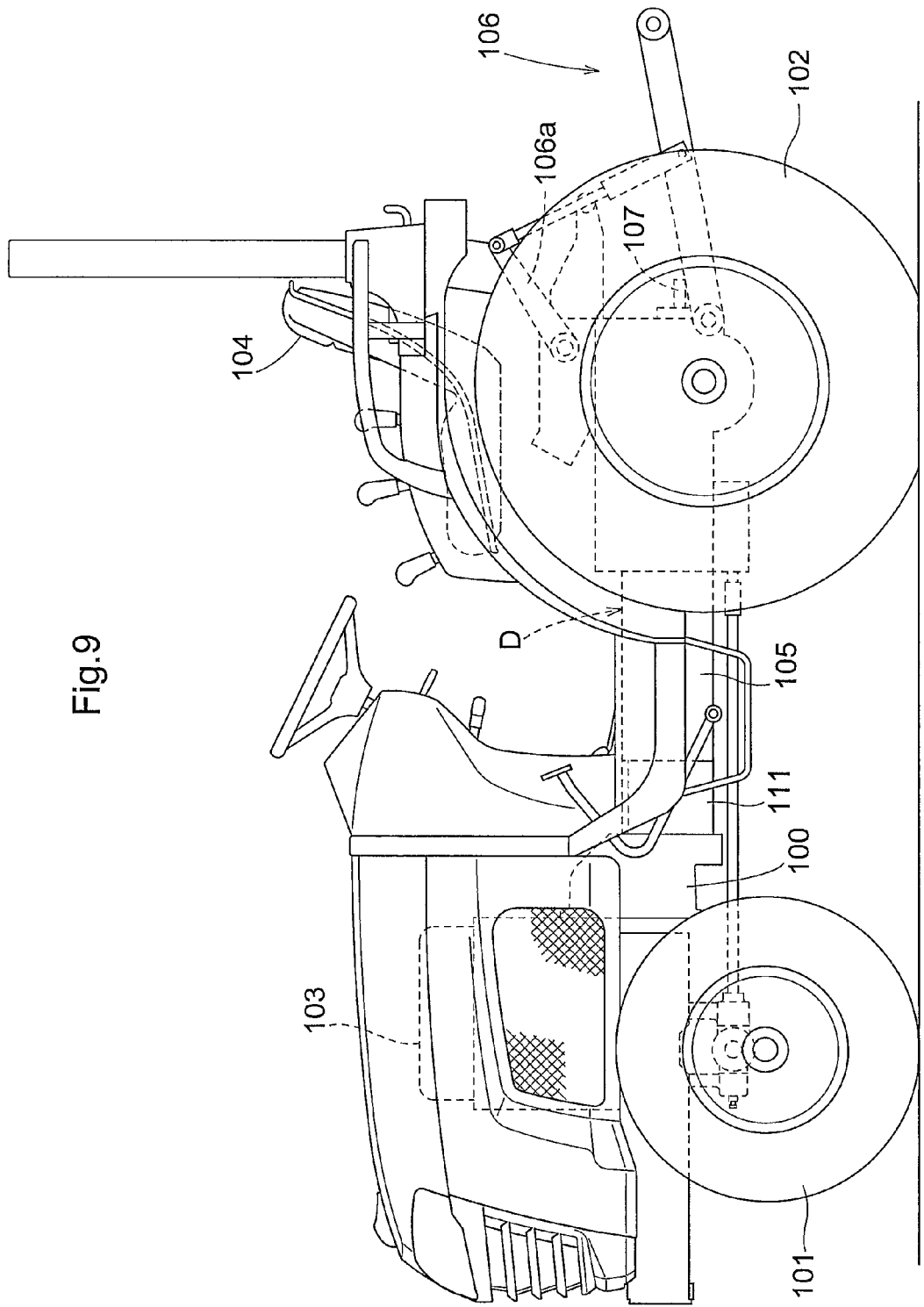
FIG. 9 is a side view showing a tractor relating to a second embodiment in its entirety.

FIG. 9 is a side view showing a tractor in its entirety. As shown in this figure, the tractor comprises a self-propelled vehicle self-propelled by a pair of right and left steerable and drivable front wheels 101, 101 and a pair of right and left drivable rear wheels 102, 102; an engine section provided at a front portion of the vehicle body of this self-propelled vehicle and mounting an engine 103; a riding type driving section provided at a rear portion of the vehicle body and mounting a driver's seat 104; a link mechanism 106 having a pair of right and left lift arms 106a, 106a pivotally and liftably attached to a transmission case constituting the rear portion a vehicle body frame 105 of the self-propelled vehicle; and a power takeoff (PTO) shaft 107 protruding from the transmission case rearwardly of the vehicle body.

In this tractor, a rotary tiller device is operably coupled to a rear portion of the vehicle body via a link mechanism 106, so that the tiller device may be lifted up/down. In operation, as a drive force outputted from the engine 103 is transmitted via the PTO shaft 107 to the rotary tiller device, for example, the tractor constitutes a riding type tiller machine. In this way, the tractor can constitute various kinds of riding type work machines with operative attachments of various work implements to the rear portion of the vehicle body, with the implements being liftable and drivable.

Figure 10:
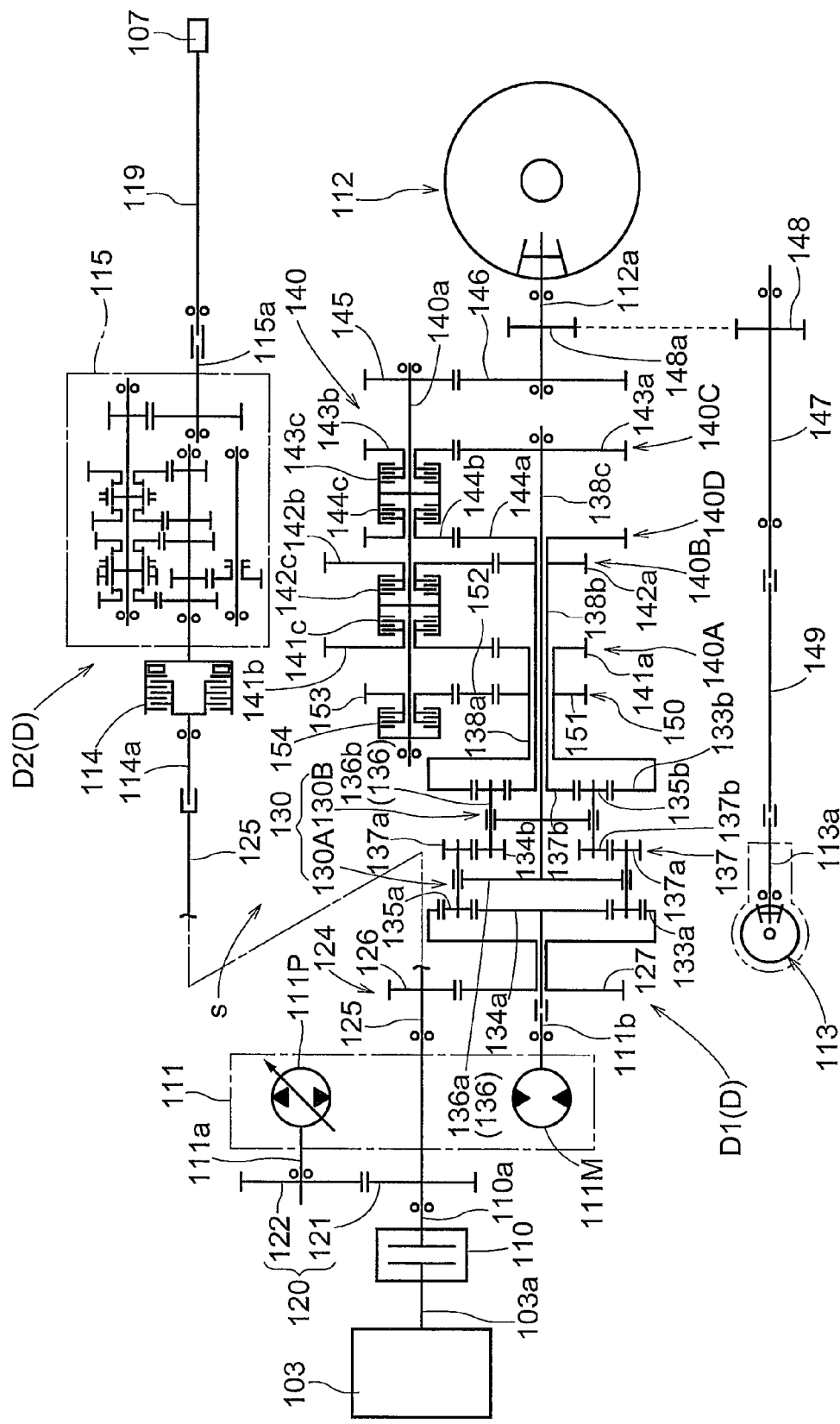
FIG. 10 is a skeleton showing a transmission apparatus.

FIG. 10 is a skeleton showing a transmission apparatus D mounted on the self-propelled vehicle so as to transmit the drive force outputted from the engine 103 to the pair of right and left front wheels 101, 101 and the pair of right and left rear wheels 102, 102, together constituting the traveling device, and to the PTO shaft 107. As shown in this figure, the transmission apparatus D includes a traveling transmission apparatus section D1, wherein the drive force from an output shaft 103a of the engine 103 is inputted from an output shaft 110a of a main clutch mechanism 110 provided rearwardly of the engine 103 to a hydrostatic stepless speed changing section 111 and a planetary transmission section 130, and the force from this planetary transmission section 130 is transmitted to a traveling transmission section (s) and then from this traveling transmission section (s) to a rear wheel differential mechanism 112 and a front wheel differential mechanism 113 to be transmitted eventually to the pair of right and left rear wheels 102, 102 and the pair of right and left front wheels 101, 101. The transmission apparatus D further includes a work transmission apparatus section D2, wherein the drive force from the output shaft 103a of the engine 103 is inputted to a work clutch 114 via a rotary transmission shaft 125 and a rotary transmission shaft 114a, and the force from this work clutch 114 is transmitted to a work speed changing section 115 and then from this work speed changing section 115 to the PTO shaft 107.

The work speed changing section 115 is capable of changing speed into a plurality of stages of speeds by means of a plurality of shift gears and transmitting, from the output shaft 115a via the work transmission shaft 119 to the PTO shaft 107, the speed-changed drive force inputted from the work clutch 114.

The traveling transmission apparatus section D1 will be described next.

As shown in FIG. 10, the traveling transmission apparatus section D1 includes: a hydrostatic stepless speed changing section 111 having its input shaft 111a operably coupled via an input gear mechanism 120 to an output shaft 110a of the main clutch mechanism 110; the planetary transmission section 130 having an input side ring gear 133a operably coupled via a planetary coupling mechanism 124 to the output shaft 110a of the main clutch mechanism 110; and the traveling transmission section (s) configured to input from the planetary transmission section 130 to either a speed range setting section 140 or a reverse transmission section 150 and to transmit power from an output shaft 140a to the rear wheel differential mechanism 112 and the front wheel differential mechanism 113 in the case of whichever input to the speed range setting section 140 or the reverse transmission section 150.

The input gear mechanism 120 for operably coupling the output shaft 110a of the main clutch mechanism 110 to the input shaft 111a of the hydrostatic stepless speed changing section 111 includes an output shaft gear 121 mounted on the output shaft 110a of the main clutch mechanism 110 to be rotatable therewith, and an input shaft gear 122 meshed with this output shaft gear 121 and mounted on the input shaft 111a of the hydrostatic stepless speed changing section 111 to be rotatable therewith.

The planetary coupling mechanism 124, operably coupling the output shaft 110a of the main clutch mechanism 110 to the input side ring gear 133a of the planetary transmission section 130, includes: a rotational transmission shaft 125 formed to be rotatable together with the output shaft 110a of the main clutch mechanism 110; a transmission gear 126 mounted on this rotational transmission shaft 125 to be rotatable therewith; and an input gear 127 meshed with the transmission gear 126 and provided on the input side ring gear 133a to be rotatable therewith.

The hydrostatic stepless speed changing section 111 includes a hydraulic pump 111P having the input shaft 111a acting as a pump shaft thereof, and a hydraulic motor 111M connected to this hydraulic pump 111P via a drive circuit. The hydraulic pump 111P is constructed as an axial plunger, variable displacement type hydraulic pump and the hydraulic motor 111M is constructed as an axial plunger type hydraulic motor.

Accordingly, with this hydrostatic stepless speed changing section 111 in operation, the hydraulic pump 111P is driven by a drive force inputted from the engine 103 to the input shaft 111a via the planetary coupling mechanism 120 and the main clutch mechanism 110, so that the hydraulic pump 111P supplies a hydraulic pressure to the hydraulic motor 111M, whereby the motor 111M is driven to output a force via its motor shaft 111b. The hydrostatic stepless speed changing section 111 is speed-changed into a forward rotation speed state, a neutral state or a reverse rotation speed state, in response to an operation of changing a swash plate angle of the hydraulic pump 111P. When speed-changed into the forward rotation speed state, the drive force in the forward rotation direction is outputted from the motor shaft 111b. When speed-changed into the neutral state, the output from the motor shaft 111b is stopped. When speed-changed into the reverse rotation speed state, the drive force in the reverse rotation direction is outputted from the motor shaft 111b. The hydrostatic stepless speed changing section 111, whichever speed-changed into the forward rotation speed state or the reverse rotation speed state, operates to steplessly change the output speed from the motor shaft 111b in response to an operation of changing the swash plate angle.

Figure 11:
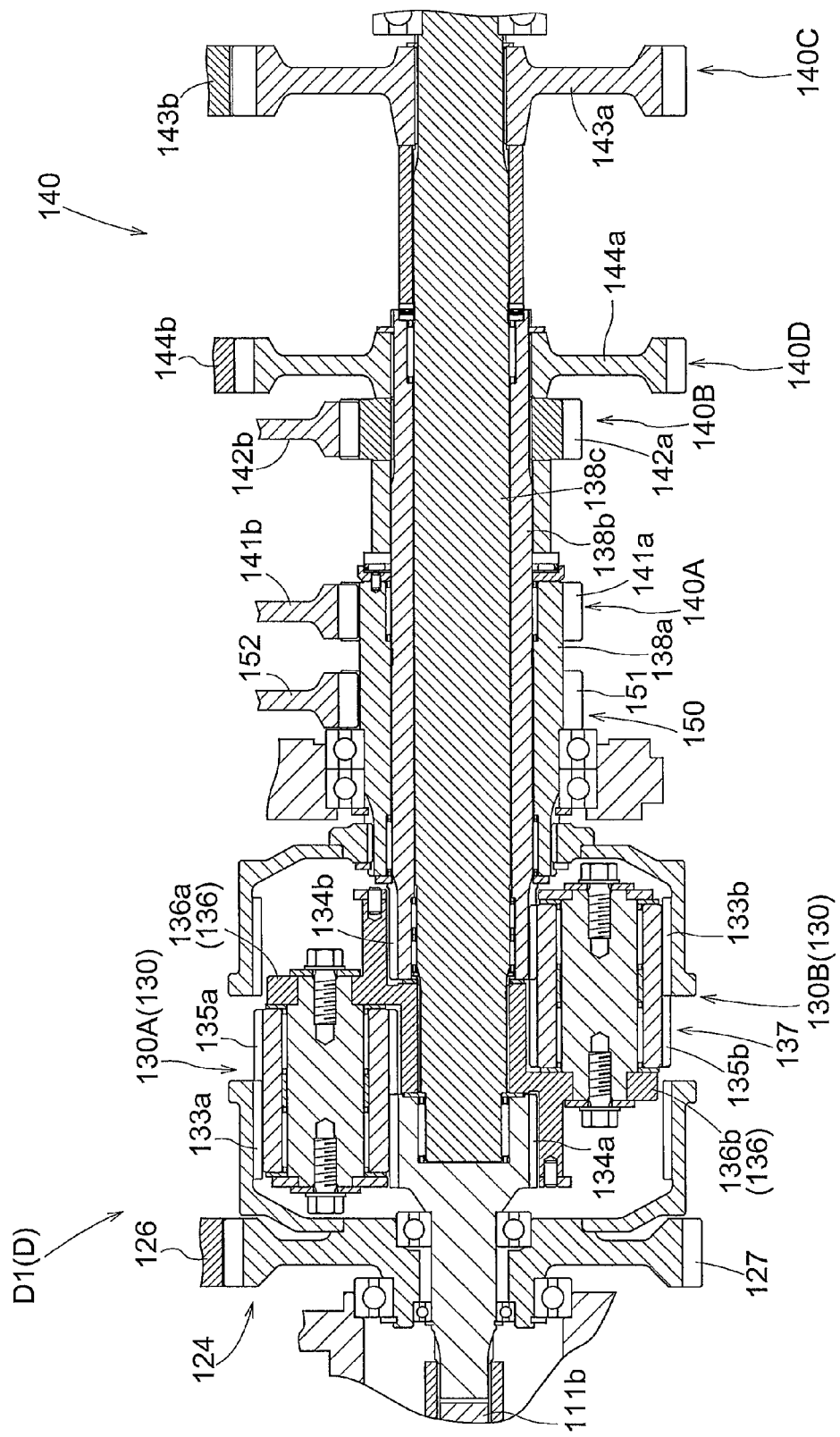
FIG. 11 is a section showing a planetary transmission section.

FIG. 11 is a section view showing the planetary transmission section 130. As shown in FIG. 10 and FIG. 11, the planetary transmission section 130 is disposed on the downstream side in the transmission direction relative to the hydraulic pump 111P and the hydraulic motor 111M together constituting the hydrostatic stepless speed changing section 111. The planetary transmission section 130 includes: an input side planetary gear mechanism 130A having an input side sun gear 134a coupled to the motor shaft 111b of the hydrostatic stepless speed changing section 111 to be rotatable therewith and an input side ring gear 133a operably coupled to the rotational transmission shaft 125 via the planetary coupling mechanism 124; and an output side planetary transmission mechanism 130B disposed downstream of the input side planetary gear mechanism 130A in the transmission direction. An input side carrier 136a supporting the input side planetary gear 135a of the input side planetary gear mechanism 130A and an output side carrier 136b supporting the output side planetary gear 135b of the output side planetary gear mechanism 130B are formed as an integral carrier 136. That is, the planetary transmission section 130 is comprised of a composite planetary gear mechanism consisting: the pair of planetary gear mechanisms of the input side planetary gear mechanism 130A and the output side planetary gear mechanism 130B; and the gear coupling mechanism 137 for operably coupling the input side planetary gear 135a constituting the input side planetary gear mechanism 130A to the output side planetary gear 136b constituting the output side planetary gear mechanism 130B. The gear coupling mechanism 137 is comprised of meshing operable coupling of a gear 137a formed integral with the input side planetary gear 135a to have a continuous construction with a same outer diameter as this input side planetary gear 135a, and a gear 137b formed integral with the output side planetary gear 135b to have a continuous construction with a same outer diameter as this output side planetary gear 135b. Alternatively, this gear coupling mechanism 137 may be comprised of operative coupling of a gear formed separately from the input side planetary gear 135a and coupled to this input side planetary gear 135a via a connecting shaft to be rotatable therewith, and a gear formed separately from the output side planetary gear 135b and coupled to this output side planetary gear 135b via a connecting shaft to be rotatable therewith.

From a side adjacent the output side planetary gear mechanism 130A constituting the planetary transmission section 130 to a side remote from the hydrostatic stepless speed changing section 111, three combined force output shafts 138a, 138b, 138c are extended in a triple-layered shaft arrangement to be rotatable relative to one another about a common axis.

The combined force output shaft 138c located innermost of the three combined force output shafts 138a, 138b, 138c of the triple-layered shaft arrangement is operably coupled to a carrier 136 to be rotatable therewith. The combined force output shaft 138b located intermediate of the three combined force output shafts 138a, 138b, 138c of the triple-layered shaft arrangement is operably coupled to an output side sun gear 134b constituting the output side planetary gear mechanism 130B. The combined force output shaft 138c located outermost of the three combined force output shafts 138a, 138b, 138c of the triple-layered shaft arrangement is operably coupled to an output side ring gear 133b constituting the output side planetary gear mechanism 130B.

With this planetary transmission section 130 in operation, the drive force outputted from the engine 103 is inputted to the input side ring gear 133a via the main clutch mechanism 110 and the planetary coupling mechanism 124; the drive force outputted from the hydrostatic stepless speed changing section 111 via the motor shaft 111b is inputted to the input side sun gear 134a; then, the drive force inputted from the engine 103 and the drive force inputted from the hydrostatic stepless speed changing section 111 are combined and synthesized together by the input side planetary mechanism 130A and the output side planetary transmission mechanism 130B; and the resultant combined (synthesized) drive force is outputted from the carrier-coupled combined force output shaft 138c, the sun-gear coupled combined force output shaft 138b and the ring gear coupled combined force output shaft 138a. The planetary transmission section 130 does not combine or synthesize a reverse traveling drive force, in whichever case the hydrostatic stepless speed changing section 111 is operated into the forward rotation speed state or the reverse rotation speed state, but combines and synthesizes only the forward traveling drive force and outputs it from the carrier coupled combined force output shaft 138c, the sun gear coupled combined force output shaft 138b and the ring gear coupled combined output force shaft 138a.

The speed range setting section 140 constituting the traveling transmission section (s) includes: an output shaft 140a disposed parallel with the three combined force output shafts 138a, 138b, 138c of the three-layered shaft arrangement; and a first speed range setting section 140A, a second speed range setting section 140B, a third speed range setting section 140C and a fourth speed range setting section 140D whose transmission-wise downstream portions are operably coupled with the output shaft 140a.

The first speed range setting section 140A includes: a first speed input gear 141a mounted on the ring gear coupled combined force output shaft 138a to be rotatable therewith; a forward first speed transmission gear 141b meshed with the first speed input gear 141a to be operably coupled with the ring gear coupled combined force output shaft 138a and rotatably supported on the output shaft 140a under this operably coupled state; and a first speed clutch 141c provided between the forward first speed transmission gear 141b and the output shaft 140a and comprised of a multiple plate hydraulic operation friction clutch.

The second speed range setting section 140B includes: a second speed input gear 142a mounted on the sun gear coupled combined force output shaft 138b, which is the shaft not coupled with the first speed input gear 141a of the three combined force output shafts 138a, 138b, 138c; a forward second speed transmission gear 142b meshed with the second speed input gear 142a to be operably coupled to the sun gear coupled combined force output shaft 138b and rotatably mounted on the output shaft 140a under this operably coupled state; and a second speed clutch 142c provided between the forward second speed transmission gear 142b and the output shaft 140a and comprised of a multiple plate hydraulic operation friction clutch.

The third speed range setting section 140C includes: a third speed input gear 143a mounted on the carrier coupled combined force output shaft 138c to be rotatable therewith, which is the shaft not coupled with the second speed input gear 142a of the three combined force output shafts 138a, 138b, 138c; a forward third speed transmission gear 143b meshed with the third speed input gear 143a to be operably coupled with the carrier coupled combined force output shaft 138c and rotatably supported on the output shaft 138c under this operably coupled state; and a third speed clutch 143c provided between the forward third speed transmission gear 143b and the output shaft 140a and comprised of a multiple plate hydraulic operation friction clutch.

The fourth speed range setting section 140D includes: a fourth speed input gear 144a mounted on the sun gear coupled combined force output shaft 138a to be rotatable therewith, which is the shaft not coupled with the third speed input gear 143a of the three combined force output shafts 138a, 138b, 138c; a forward fourth speed transmission gear 144b meshed with the fourth speed input gear 144a to be operably coupled with the sun gear coupled combined force output shaft 138c and rotatably supported on the output shaft 140a under this operably coupled state; and a fourth speed clutch 144c provided between the forward fourth speed transmission gear 144b and the output shaft 140a and comprised of a multiple plate hydraulic operation friction clutch.

The forward first speed transmission gear 141b, the forward second speed transmission gear 142b, the forward third speed transmission gear 143b and the forward fourth speed transmission gear 144b are mounted on the output shaft 140a to be rotatable relative to the output shaft 140a, and juxtaposed along the axial direction of the output shaft 140a. Each one of the forward first speed transmission gear 141b, the forward second speed transmission gear 142b, the forward third speed transmission gear 143b and the forward fourth speed transmission gear 144b is rotatable about the axis of the output shaft 140a, and the rotational axes of the forward first speed transmission gear 141b, the forward second speed transmission gear 142b, the forward third speed transmission gear 143b and the forward fourth speed transmission gear 144b are linearly juxtaposed. The output shaft 140a is operably coupled to the input shaft 112a of the rear wheel differential mechanism 112 via the output gear 145 mounted at the rear end of this output shaft 140a to be rotatable therewith, and via the transmission gear 146 meshed with the output gear 145 and mounted on the input shaft 112a of the rear wheel differential mechanism 112 to be rotatable therewith. The output shaft 140a is operably coupled with the input shaft 113a of the front wheel differential mechanism 113 via the output gear 145, the transmission gear 146, the input shaft 112a of the rear wheel differential mechanism 112, the transmission gear 148a mounted on this input shaft 112a to be rotatable therewith, the transmission gear 148 meshed with this transmission gear 148a and mounted on the front wheel output shaft 147 to be rotatable therewith, a front wheel output shaft 147, and a rotational shaft 149.

The first speed range setting section 140A and the second speed range setting section 140B are configured such that the rotational speed of the ring gear coupled combined force output shaft 138a or the sun gear coupled combined force output shaft 138b is transmitted, with reduction to ½ of the speed, to the output shaft 140a. The third speed range setting section 140C and the fourth speed range setting section 140D are configured such that the rotational speed of the carrier coupled combined force output shaft 138c or the sun gear coupled combined force output shaft 138b is transmitted at the doubled speed to the output shaft 140a.

Therefore, with the speed range setting section 140 in operation, when the first speed clutch 141c is switched into the engaged state and the second speed clutch 142c, the third speed clutch 143c and the fourth speed clutch 144c are switched into the disengaged state respectively, there is provided a first speed range setting state, wherein the forward drive force outputted by the planetary transmission section 130 from the ring gear coupled combined force output shaft 138a is transmitted by the first speed range setting section 140A to the output shaft 140a, and the force is transmitted as it is as the forward drive force from the rear end portion of this output shaft 140a toward the rear wheel differential mechanism 112 and the front wheel differential mechanism 113.

Further, with the speed range setting section 140 in operation, when the second speed clutch 142c is switched into the engaged state and the first speed clutch 141c, the third speed clutch 143c and the fourth speed clutch 144c are switched into the disengaged state respectively, there is provided a second speed range setting state, wherein the forward drive force outputted by the planetary transmission section 130 from the sun gear coupled combined force output shaft 138b is transmitted by the second speed range setting section 140B to the output shaft 140a, and the force is transmitted as it is as the forward drive force from the rear end portion of this output shaft 140a toward the rear wheel differential mechanism 112 and the front wheel differential mechanism 113.

Further, with the speed range setting section 140 in operation, when the third speed clutch 143c is switched into the engaged state and the first speed clutch 141c, the second speed clutch 142c and the fourth speed clutch 144c are switched into the disengaged state respectively, there is provided a third speed range setting state, wherein the forward drive force outputted by the planetary transmission section 130 from the carrier coupled combined force output shaft 138c is transmitted by the third speed range setting section 140C to the output shaft 140a, and the force is transmitted as it is as the forward drive force from the rear end portion of this output shaft 140a toward the rear wheel differential mechanism 112 and the front wheel differential mechanism 113.

Further, with the speed range setting section 140 in operation, when the fourth speed clutch 144c is switched into the engaged state and the first speed clutch 141c, the second speed clutch 142c and the third speed clutch 143c are switched into the disengaged state respectively, there is provided a fourth speed range setting state, wherein the forward drive force outputted by the planetary transmission section 130 from the sun gear coupled combined force output shaft 138b is transmitted by the fourth speed range setting section 140D to the output shaft 140a, and the force is transmitted as it is as the forward drive force from the rear end portion of this output shaft 140a toward the rear wheel differential mechanism 112 and the front wheel differential mechanism 113.

Further, if the first speed clutch 141c, the second speed clutch 142c, the third speed clutch 143c and the fourth speed clutch 143d are switched into the disengaged state respectively, the speed range setting section 140 provides a neutral state, wherein the force transmission to the output shaft 140a is stopped.

The reverse transmission section 150 constituting the traveling transmission section (s) includes: an input gear 151 mounted on the ring gear coupled combined force output shaft 138a; a reverse gear 152 meshed with this input gear 151; a reverse transmission gear 153 meshed with the reverse gear 152 to be operably coupled to the ring gear coupled combined force output shaft 138a, the reverse transmission gear 153 being rotatably supported under this state on the output shaft 140a; and a multiple plate, hydraulic operation friction type reverse transmission clutch 154 provided between the reverse transmission gear 153 and the output shaft 140a.

When the reverse transmission clutch 154 is switched into the engaged state, the reverse transmission section 150 provides a transmission state, wherein the forward drive force outputted by the planetary transmission section 130 from the ring gear coupled combined force output shaft 138a is converted into a reverse drive force and this force is transmitted to the output shaft 140a, and from this output shaft 140a to the rear wheel differential mechanism 112 and the front wheel differential mechanism 113.

When the reverse transmission clutch 154 is switched into the disengaged state, the reverse transmission section 150 provides a neutral state, wherein the force transmission to the output shaft 140a is stopped.

Figures 12, 13:
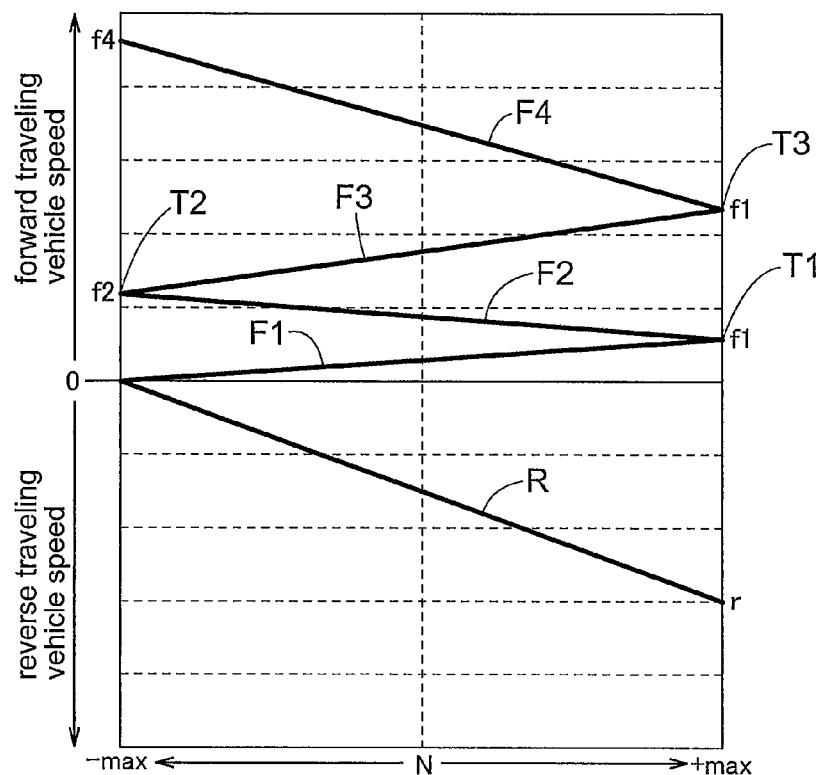
FIG. 12 is an explanatory view illustrating relationship among speed states of a hydraulic stepless speed changing section and traveling speeds of the self-propelled vehicle.
FIG. 13 is an explanatory view illustrating relationship among operational states of a reverse transmission clutch, a first speed clutch, a second speed clutch, a third speed clutch and a fourth speed clutch, traveling directions of the self-propelled vehicle and speed ranges.

FIG. 12 is an explanatory view illustrating relationship between speed states of the hydrostatic stepless speed changing section 111 which is accelerator-set for causing the engine 103 to output a drive force of a predetermined speed, and traveling speeds (vehicle speeds) of the self-propelled vehicle. The horizontal axis in FIG. 12 represents the speed states of the hydrostatic stepless speed changing section 111; the mark "N" on the horizontal axis denotes the neutral position of the hydrostatic stepless speed changing section 111; the mark "+max" on the horizontal axis denotes the highest speed position in the forward rotation speed state of the hydrostatic stepless speed changing section 111; and the mark "−max" on the horizontal axis denotes the highest speed position in the reverse rotation speed state of the hydrostatic stepless speed changing section 111. The vertical axis in FIG. 12 represents the vehicle speed.

The mark "0" on the vertical axis denotes the zero vehicle speed. The upper portion of the vertical axis greater than "0" denotes forward traveling vehicle speed and the lower portion of the vertical axis smaller than "0" denotes reverse traveling vehicle speed.

The solid line F1 shown in FIG. 12 represents vehicle speed change in the first speed range in case the self-propelled vehicle is forwarded. The solid line F2 shown in FIG. 12 represents vehicle speed change in the second speed range in case the self-propelled vehicle is forwarded. The solid line F3 shown in FIG. 12 represents vehicle speed change in the third speed range in case the self-propelled vehicle is forwarded. The solid line F4 shown in FIG. 12 represents vehicle speed change in the fourth speed range in case the self-propelled vehicle is forwarded. The solid line R shown in FIG. 12 represents vehicle speed change in case the self-propelled vehicle is reversed.

FIG. 13 is an explanatory view illustrating relationship among operational states of the reverse transmission clutch 154, the first speed clutch 141c, the second speed clutch 142c, the third speed clutch 143c and the fourth speed clutch 144c, traveling directions of the self-propelled vehicle and speed ranges and speed modes. The mark "ON" shown in FIG. 13 denotes engaged states of the reverse transmission clutch 154, the first speed clutch 141c, the second speed clutch 142c, the third speed clutch 143c and the fourth speed clutch 144c. The mark "OFF" shown in FIG. 12 denotes disengaged states of the reverse transmission clutch 154, the first speed clutch 141c, the second speed clutch 142c, the third speed clutch 143c and the fourth speed clutch 144c.

As shown in FIG. 12 and FIG. 13, when the reverse transmission clutch 154 is operated into the disengaged state, the switchover control of the first speed clutch 141c, the second speed clutch 142c, the third speed clutch 143c and the fourth speed clutch 144c is effected. While the reverse transmission clutch 154 is kept under the disengaged "OFF" state, the first speed clutch 141c is switched to the engaged "ON" state, whereas the second speed clutch 142c, the third speed clutch 143c and the fourth speed clutch 144c are switched to the disengaged "OFF" state. Then, while the first speed clutch 141c is kept under the engaged "ON" state and the second speed clutch 142c, the third speed clutch 143c and the fourth speed clutch 144c are kept under the disengaged "OFF" state, and as the hydrostatic stepless speed changing section 111 is speed-changed from the highest speed position "−max" under the reverse rotation state to the highest speed position "+max" under the forward rotation state, the forward traveling vehicle speed is increased steplessly from the zero "0" in the first speed range (F1). When the hydrostatic stepless speed changing section 111 reaches the highest speed position "+max" under the forward rotation state, the forward traveling vehicle speed becomes "f1".

When the hydrostatic stepless speed changing section 111 reaches the highest speed position "+max" under the forward rotation state, there is realized a switchover point T1 for switching over between the first speed range and the second speed range. Simultaneously with the realization of this switchover point T1, the first speed clutch 141c is switched to the disengaged state and the second speed clutch 142c is switched to the engaged state. At the switchover point T1, first, both the first speed clutch 141c and the second speed clutch 142c are operated to the engaged "ON" state so as to avoid interruption in the output. Then, the first speed clutch 141c is switched to the disengaged "OFF" state and the second clutch 142c is switched to the engaged "ON" state. Thereafter, the second speed clutch 142c is maintained under the engaged "ON" state and the first speed clutch 141c, the third speed clutch 143c and the fourth speed clutch 144c are kept under the disengaged "OFF" state. And, under this condition, as the hydrostatic stepless speed changing section 111 is speed-changed from the highest speed position "+max" under the forward rotation state toward the highest speed position "−max" under the reverse rotation state, the forward traveling vehicle speed is increased steplessly from "f1" in the second speed range (F2). Upon arrival of the hydrostatic stepless speed changing section 11 at the highest speed position "−max" under the reverse rotation state, the forward traveling speed becomes "f2".

When the hydrostatic stepless speed changing section 111 reaches the highest speed position "−max" under the reverse rotation state, there is realized a switchover point T2 for switching over between the second speed range and the third speed range. Simultaneously with the realization of this switchover point T2, the second speed clutch 142c is switched into the disengaged "OFF" state and the third speed clutch 143c is switched into the engaged "ON" state. At the switchover point T2, first, both the second speed clutch 142c and the third speed clutch 143c are operated to the engaged "ON" state so as to avoid interruption in the output. Then, the second speed clutch 142c is switched into the disengaged "OFF" state and the third clutch 143sc is switched into the engaged "ON" state. Thereafter, the third speed clutch 143c is maintained under the engaged "ON" state and the first speed clutch 141c, the second speed clutch 142c and the fourth speed clutch 143c are kept under the disengaged "OFF" state. And, under this condition, as the hydrostatic stepless speed changing section 111 is speed-changed from the highest speed position "−max" under the reverse rotation state toward the highest speed position "+max" under the forward rotation state, the forward traveling vehicle speed is increased steplessly from "f2" in the third speed range (F3). Upon arrival of the hydrostatic stepless speed changing section 111 at the highest speed position "+max" under the forward rotation state, the forward traveling speed becomes "f3".

When the hydrostatic stepless speed changing section 111 reaches the highest speed position "+max" under the forward rotation state, there is realized a switchover point T3 for switching over between the third speed range and the fourth speed range. Simultaneously with the realization of this switchover point T3, the third speed clutch 143c is switched into the disengaged "OFF" state and the fourth speed clutch 144c is switched into the engaged "ON" state. At the switchover point T3, first, both the third speed clutch 143c and the fourth speed clutch 144c are operated to the engaged "ON" state so as to avoid interruption in the output. Then, the third speed clutch 143c is switched into the disengaged "OFF" state and the fourth clutch 144c is switched into the engaged "ON" state. Thereafter, the fourth speed clutch 144c is maintained under the engaged "ON" state and the first speed clutch 141c, the second speed clutch 142c and the third speed clutch 143c are kept under the disengaged "OFF" state. And, under this condition, as the hydrostatic stepless speed changing section 111 is speed-changed from the highest speed position "+max" under the forward rotation state toward the highest speed position "−max" under the reverse rotation state, the forward traveling vehicle speed is increased steplessly from "f3" in the fourth speed range (F4). Upon arrival of the hydrostatic stepless speed changing section 111 at the highest speed position "−max" under the reverse rotation state, the forward traveling speed becomes "f4".

As shown in FIG. 12 and FIG. 13, if the reverse transmission clutch 154 is operated into the engaged "ON" state, the first speed clutch 141c, the second speed clutch 142c, the third speed clutch 143c and the fourth speed clutch 144c are kept under the disengaged "OFF" state. While the reverse transmission clutch 154 is operated to the engaged "ON" state, as the hydrostatic stepless speed changing section 111 is speed-changed from the highest speed position "−max" under the reverse rotation state toward the highest speed position "+max" under the forward rotation state, the reverse traveling vehicle speed is increased steplessly from the zero "0" in the reverse range (R). Upon arrival of the hydrostatic stepless speed changing section 111 at the highest speed position "+max" under the forward rotation state, the reverse traveling vehicle speed becomes "r".

The reduction ratio when the reverse transmission section 150 transmits the rotation of the combined force output shaft 138a at a reduced speed to the output shaft 140a is set smaller than the reduction ratio when the first speed range setting section 140A transmits the rotation of the combined force output shaft 138a at a reduced speed to the output shaft 140a, so that the highest vehicle speed "r" of the reverse traveling vehicle speed is higher than the highest vehicle speed "f1" in the forward first speed range.

Figure 14:
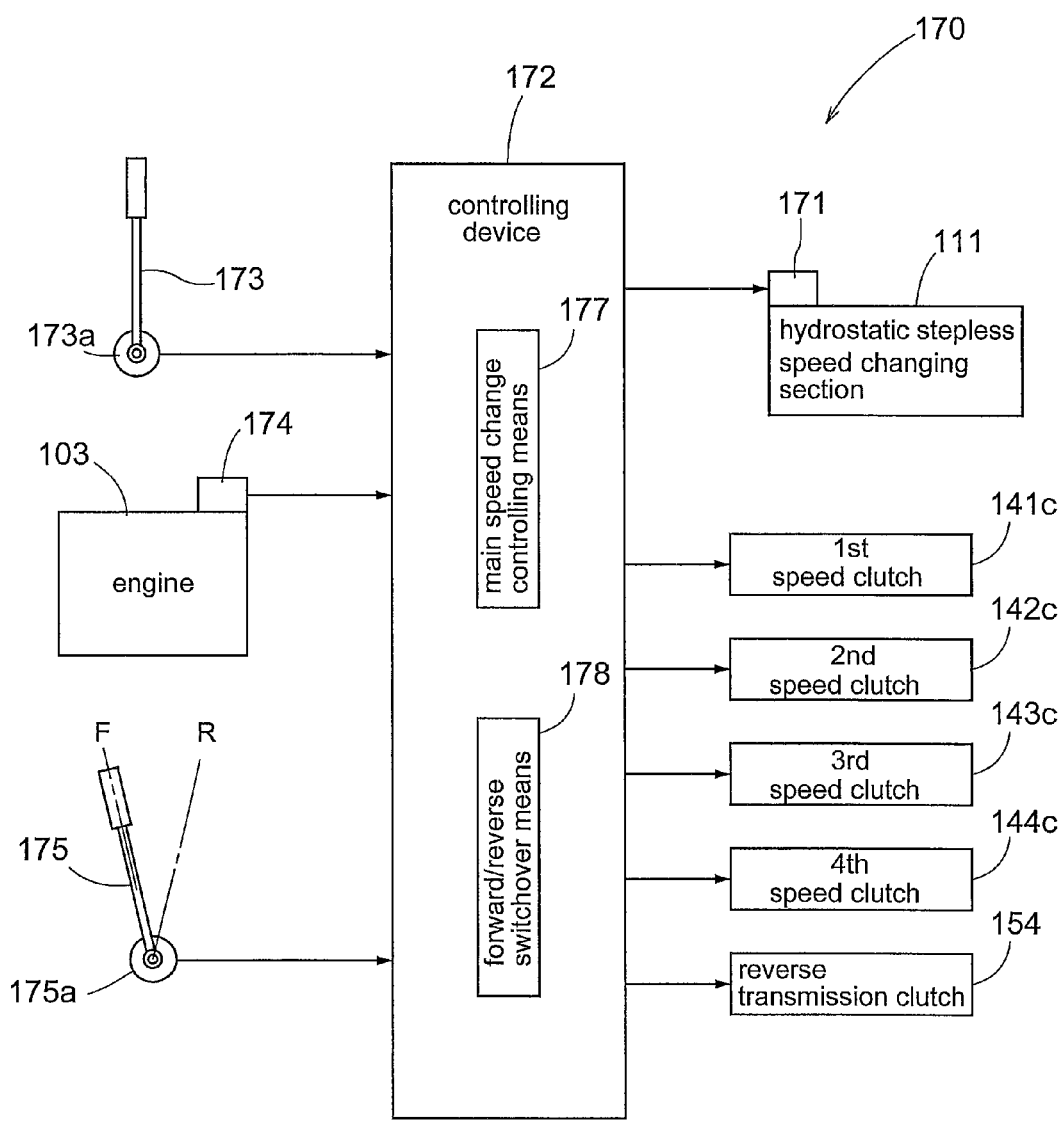
FIG. 14 is a block diagram showing a speed changing device.

FIG. 14 is a block diagram showing a speed change operating apparatus 170 for speed changing the traveling transmission apparatus section D1. As shown in this figure, the speed change operating apparatus 170 includes: a controlling device 172 operably coupled respectively with a speed change operating section 171 provided in the hydrostatic stepless speed changing section 111 for effecting swash plate angle change of the hydraulic pump 111P, a switching section (not shown) for the first speed transmission clutch 141c, a switching section (shown) for the second speed clutch 142c, a switching section (shown) for the third speed clutch 143c, a switching section (shown) for the fourth speed clutch 144c, and a switching section (shown) for the fourth speed clutch 144c; a speed changing lever 173; an engine rotation sensor 174 for detecting output speed of the engine 103; and a forward/reverse lever 175.

The speed changing lever 173 is operably coupled to the controlling device 172 via a speed change detecting sensor 173a which is coupled to the speed changing lever 173. The speed change detecting sensor 173a is constituted from a rotation potentiometer having its rotation operational portion coupled to the speed changing lever 173 for detecting an operational position of the speed changing lever 173 and outputting the result of this detection to the controlling device 172.

The forward/reverse lever 175 is operably coupled to the controlling device 172 via a forward/reverse detection sensor 175a which is coupled to the forward/reverse lever 175. The forward/reverse detection sensor 175a is constituted from a rotation potentiometer having its rotation operational portion coupled to the forward/reverse lever 175 for detecting an operational position of the forward/reverse lever 175 and outputting the result of this detection to the controlling device 172.

The controlling device 172 is constructed by utilizing a microcomputer, and includes a main speed change controlling means 177 and a forward/reverse switchover means 178.

The main speed change controlling means 177 detects, based on the detection information of the engine rotation sensor 174, an output speed of the engine 103 under a condition of the engine 103 being set for acceleration; and judges the operational position of the speed change lever 173 based upon the detection information of the speed change detecting sensor 173a. Then, based upon these detected output speed of the engine 103 and the judged operational position of the speed changing lever 173, the main speed change controlling means 177 effects automatic speed change control of the hydrostatic stepless speed changing section 111 so that a predetermined forward traveling vehicle speed or reverse traveling vehicle speed corresponding to the operational positions of the speed changing lever 173 and the forward/reverse lever 175 is realized, and effects also automatic switchover control of the first speed clutch 141c, the second speed clutch 142c, the third speed clutch 143c and the fourth speed clutch 144c.

In response to an operation of the forward/reverse lever 175 to the forward position "F", the forward/reverse switchover means 178 automatically switches over the reverse transmission clutch 154 to the disengaged "OFF" state based upon the detection information of the forward/reverse detecting sensor 175a. In response to an operation of the forward/reverse lever 175 to the reverse position "R", the forward/reverse switchover means 178 automatically switches over the reverse transmission clutch 154 to the engaged "ON" state based upon the detection information of the forward/reverse detecting sensor 175a.

[Other Alternative Embodiments of Second Embodiment]

(1) In the foregoing embodiment, the first speed clutch 141c, the second speed clutch 142c, the third speed clutch 143c, the fourth speed clutch 144c, the reverse transmission clutch 154 are constituted from the friction type clutches in order to allow for smooth and speedy operations with switchover between the first speed range F1 and the second speed range F2, switchover between the second speed range F2 and the third speed range F3, switchover between the third speed range F3 and the fourth speed range F4, and switchover between forward and reverse traveling directions. Instead, these clutches can be constituted from meshing type clutches. Further alternatively, it is also possible to constitute one or more of these clutches of a friction type clutch(s) and the other clutches of meshing type clutches.

(2) In the foregoing embodiment, the planetary transmission section 130 is constituted from a composite planetary gear mechanism. Instead, planetary transmission section 130 can be constituted from a standard planetary gear mechanism having multiple stages of gear mechanisms.

(3) In the foregoing embodiment, the front wheels 1 and the rear wheels 2 are provided as the traveling device. However, a crawler type traveling device can be provided instead of such a wheel type traveling device.

Industrial Applicability

The present invention may be used not only as a transmission apparatus to be provided in a tractor having a work implement mounted to a rear portion of the vehicle body, but also as a transmission apparatus to be provided in a tractor having a work implement such as a grass mower or the like mounted between the front and rear wheels of the vehicle body or to a front portion of the vehicle body.

DESCRIPTION OF REFERENCE MARKS AND NUMERALS 1, 2 traveling device
3 engine
11 hydrostatic stepless speed changing section
30 planetary transmission section
31 low speed side output gear
32 high speed side output gear
40 speed range setting section
41 low speed side speed changing gear
42 high speed side speed changing gear
43 output shaft
44 counter shaft
45 low speed transmission clutch
46 high speed transmission clutch
47 counter gear
48 output shaft gear
50 reverse transmission section
51 reverse transmission gear
52 reverse transmission clutch
S traveling transmission section
101, 102 traveling device
103 engine
111 hydrostatic stepless speed changing section
111P pump
111M motor
130 planetary transmission section
133b ring gear
134b sun gear
136 carrier
138a ring gear coupled combined force output shaft
138b sun gear coupled combined force output shaft
138c carrier coupled combined force output shaft
140 speed range setting section
140a output shaft
141b forward first speed transmission gear
141c first speed clutch
142b forward second speed transmission gear
142c second speed clutch
143b forward third speed transmission gear
143c third speed clutch
144b forward fourth speed transmission mechanism
144c fourth speed clutch
150 reverse transmission section
152 reverse gear
153 reverse transmission gear
154 reverse transmission clutch
S traveling transmission section

The invention claimed is:

1. A transmission apparatus for a tractor comprising:
a hydrostatic stepless speed changing section configured to input a drive force from an engine;
a planetary transmission section configured to combine a drive force outputted from the hydraulic stepless speed changing section with the drive force from the engine, and to output a resultant force; and
a traveling transmission section for outputting the output from the planetary transmission section to a traveling device;
wherein said planetary transmission section is configured to output a forward drive force both in case the hydrostatic stepless speed changing section is speed-changed to a forward rotation speed change state for outputting a drive force in a forward rotation direction and in case the hydrostatic stepless speed changing section is speed-changed to a reverse rotation speed change state for outputting a drive force in a reverse rotation direction;

wherein said traveling transmission section includes:
- a speed range setting section operable to effect a change speed operation between a plurality of speed-changed transmission states wherein the forward drive force outputted from the planetary transmission section is sorted into one of a plurality of speed ranges and outputted from the speed range setting section as the forward drive force, and a neutral state wherein the drive force from the planetary transmission section is not outputted from the speed range setting section, and
- a reverse transmission section operable to switch over between a reverse transmission state wherein the forward drive force outputted from the planetary transmission section is converted into a reverse drive force and outputted from the reverse transmission section, and a neutral state wherein the drive force from the planetary transmission section is not outputted form the reverse transmission section;

wherein said planetary transmission section includes a low speed output gear and a high speed output gear;

wherein said speed range setting section includes:
- a low speed side speed changing gear mounted on a counter shaft to be rotatable relative thereto and meshed with the low speed output gear,
- a high speed side speed changing gear mounted on the counter shaft to be rotatable relative thereto and meshed with the high speed output gear,
- a counter gear mounted on the counter shaft to be rotatable therewith,
- an output shaft gear supported on an output shaft to be rotatable therewith and meshed with the counter gear,
- a low speed transmission clutch switchable between an engaged state for coupling said low speed side speed changing gear to the counter shaft to be rotatable therewith and a disengaged state for allowing rotation of said low speed side speed changing gear relative to the counter shaft, and
- a high speed transmission clutch switchable between an engaged state for coupling said high speed side speed changing gear to the counter shaft to be rotatable therewith and a disengaged state for allowing rotation of said high speed side speed changing gear relative to the counter shaft, and wherein said reverse transmission section includes:
- a reverse transmission gear supported on the output shaft to be rotatable relative thereto and meshed with said low speed side output gear; and
- a reverse transmission clutch switchable between an engaged state for coupling said reverse transmission gear to said output shaft to be rotatable therewith and a disengaged state for allowing rotation of the reverse transmission gear relative to said output shaft.

2. The transmission apparatus for a tractor according to claim 1, wherein a speed reduction transmission ratio in case the force is transmitted from the low speed side output gear via the reverse transmission gear and the reverse transmission clutch to the output shaft is set smaller than a speed reduction transmission ratio in case the force is transmitted from the low speed side output gear via the low speed side speed changing gear, the low speed transmission clutch, the counter shaft, the counter gear and the output shaft gear to the output shaft.

3. A transmission apparatus for a tractor comprising:
- a hydrostatic stepless speed changing section configured to input a drive force from an engine;
- a planetary transmission section configured to combine a drive force outputted from the hydraulic stepless speed changing section with the drive force from the engine and to output a resultant force; and
- a traveling transmission section for outputting the output from the planetary transmission section to a traveling device;

wherein said planetary transmission section is disposed downstream in the transmission direction relative to a pump and a motor that constitute said hydrostatic stepless speed changing section, and said planetary transmission section is configured to output a forward drive force both in case the hydrostatic stepless speed changing section is speed-changed to a forward rotation speed change state for outputting a drive force in a forward rotation direction and in case the hydrostatic stepless speed changing section is speed-changed to a reverse rotation speed change state for outputting a drive force in a reverse rotation direction;

wherein said traveling transmission section includes:
- a speed range setting section operable to effect a change speed operation between a plurality of speed-changed transmission states wherein the forward drive force outputted from the planetary transmission section is sorted into one of a plurality of speed ranges and outputted from the speed range setting section, and a neutral state wherein the drive force from the planetary transmission section is not outputted from the speed range setting section, and
- a reverse transmission section operable to switch over between a reverse transmission state wherein the forward drive force outputted from the planetary transmission section is converted into a reverse drive force and outputted from the reverse transmission section, and a neutral state wherein the drive force from the planetary transmission section is not outputted from the reverse transmission section;

wherein said planetary transmission section includes a sun gear, a carrier and a ring gear, a sun gear coupled combined force output shaft coupled with the sun gear, a carrier coupled combined force output shaft coupled with the carrier and a ring gear coupled combined force output shaft coupled with the ring gear extending from said planetary transmission section in the opposite direction to said hydrostatic stepless speed changing section and rotatable relative to one another about a same axis;

wherein said speed range setting section includes:
- a forward first speed transmission gear, a forward second speed transmission gear and a forward third speed transmission gear coupled in distribution respectively with said ring gear coupled combined force output shaft, said sun gear coupled combined force output shaft and said carrier coupled combined force output shaft,
- an output shaft supporting said forward first speed transmission gear, said forward second speed transmission gear and said forward third speed transmission gear, with said forward first speed transmission gear, said forward second speed transmission gear and said forward third speed transmission gear being rotatable relative to each other and with rotational axes thereof being juxtaposed linearly, a first speed clutch for coupling the forward first speed transmission gear to the output shaft to be rotatable therewith, a second speed clutch for coupling the forward second speed transmission gear to the output shaft to be rotatable therewith, and a third speed clutch for coupling the forward third speed transmission gear to the output shaft to be rotatable therewith;

wherein said reverse transmission section includes:

a reverse transmission gear coupled via a reverse gear to one of a combined force output shaft coupled to said ring gear and a further combined force output shaft coupled to said carrier, said one combined force output shaft being coupled also to said forward first speed transmission gear; and a reverse transmission clutch for coupling said reverse transmission gear to said output shaft to be rotatable therewith; and wherein said reverse transmission gear is supported to said output shaft to be rotatable relative thereto, with a rotation axis of said reverse transmission gear being juxtaposed linearly with rotation axes of said forward first speed transmission gear, said forward second speed transmission gear and said forward third speed transmission gear.

4. The transmission apparatus for a tractor according to claim 3, wherein said speed range setting section further includes:

a forward fourth speed gear coupled to one of said ring gear coupled combined force output shaft, said sun gear coupled combined force output shaft and said carrier coupled combined force output shaft, said one combined force output shaft being not coupled to said forward third speed transmission gear, said forward fourth speed gear being supported on said output shaft to be rotatable relative thereto, and a fourth speed clutch for coupling the forward fourth speed transmission gear to the output shaft to be rotatable therewith.

* * * * *